United States Patent [19]
Nishimura et al.

[11] Patent Number: 5,910,955
[45] Date of Patent: Jun. 8, 1999

[54] SWITCHING HUB CAPABLE OF CONTROLLING COMMUNICATION QUALITY IN LAN

[75] Inventors: Takashi Nishimura; Naohide Sekiya; Takeshi Kimura; Hideki Inoue; Hiroshi Nagano; Ikuo Taoka, all of Kawasaki, Japan

[73] Assignee: Fujitsu Limited, Kanagawa, Japan

[21] Appl. No.: 08/921,872

[22] Filed: Aug. 25, 1997

[30] Foreign Application Priority Data

Mar. 18, 1997 [JP] Japan .................................. 9-065028

[51] Int. Cl.$^6$ .................................................. H04L 12/46
[52] U.S. Cl. .......................... 370/401; 370/407; 370/427
[58] Field of Search .................................. 370/401, 402, 370/407, 422, 230, 235, 231, 389, 395, 398, 412, 413, 392, 397, 418, 417, 416, 415, 414, 400, 403, 404, 405, 425

[56] References Cited

U.S. PATENT DOCUMENTS

| 5,151,897 | 9/1992 | Suzuki | 370/401 |
| 5,477,547 | 12/1995 | Sugiyama | 370/401 |
| 5,633,865 | 5/1997 | Short | 370/401 |

FOREIGN PATENT DOCUMENTS

| 61-63137 | 4/1986 | Japan . |
| 61-94495 | 5/1986 | Japan . |
| 5-56063 | 3/1993 | Japan . |
| 5-199241 | 8/1993 | Japan . |

*Primary Examiner*—Chau Nguyen
*Assistant Examiner*—Kenneth Vanderpuye
*Attorney, Agent, or Firm*—Helfgott & Karas, P C.

[57] ABSTRACT

In a switching hub capable of realizing a high-speed LAN communication, this switching hub is equipped with a switch unit and a plurality of ports connected to this switch unit. When a frame is received from a terminal, each of these ports attaches a tag to which a transmission source LAN number has been set to this received frame, and thereafter supplies the frame with this tag to the switch unit. When the frame with tag is received from another port within another switching hub, the port directly supplies this frame with tag to the switch unit. The switch unit registers the transmission source LAN number of the supplied frame, a transmission source MAC address, and an input port number into a LAN table. While such a port for supplying a frame is determined, either a transmission source address of this frame or a transmission source LAN number thereof is used as a retrieve key so as to try to read out the port number from the LAN table. In the case that the port number cannot be read out, the switch unit performs the broadcast operation. When the destination LAN number can be found out by retrieving the LAN table, the next switching hub is notified by setting a tag to this destination LAN number.

15 Claims, 17 Drawing Sheets

FIG. 7

| PORT | MAC ADDRESS |
|------|-------------|
| P 1  | A           |
| P 2  | B           |
| P 3  | C           |

FIG. 8

| ETHERNET TYPE | SERVICE CLASS |
|---------------|---------------|
| S N A         | 1 · 1         |
| I P           | 5 · 1         |
| A R P         | 5 · 1         |
| R A R P       | 5 · 1         |
| AUTOPHON      | 1 · 5         |
| ⋮             | ⋮             |

FIG. 12

| PORT | LAN | MAC ADDRESS |
|---|---|---|
| P 1 | L A N 2 | |
| P 2 | L A N 3 | B |
| P 3 | L A N 4 | C、D |

| MAC ADDRESS | LAN NUMBER | PORT NUMBER |
|---|---|---|
|  | LAN 2 | P 7 |
|  | LAN 1 | P 5 |

| MAC ADDRESS | LAN NUMBER | PORT NUMBER |
|---|---|---|
| A | LAN 1 | P 8 |

SWITCHING HUB CAPABLE OF CONTROLLING COMMUNICATION QUALITY IN LAN

BACKGROUND OF THE INVENTION

1. Field of the Invention

The present invention generally relates to a switching hub used in a local area network (LAN). More specifically, the present invention is directed to a switching hub capable of controlling a communication quality of a LAN.

2. Description of the Related Art

Switching hubs may be recognized as one of very important LAN products in a so-called "ATM-LAN (Asynchronous Transfer Mode-Local Area Network) generation" in view of the below-mentioned technical points. That is, the switching hubs can be directly connected to the existing Ethernet LAN environment, and moreover the switching hubs can have the virtual LAN (VLAN) function. This VLAN function is necessarily required to merge the ATM technique into the existing LAN environment.

However, in such a case that the conventional switching hubs are applied to the multimedia communication, data drops (frame discards) happen to occur in communications in data systems, and also frame delays happen to occur in communications in sound systems.

For instance, as shown in FIG. 22, a terminal "A" used to send out a frame of a data system and another terminal "B" used to send out a frame of a sound system are connected to a conventional switching hub. Considering now such a case that the terminals "A" and "B" transmit frames in different frame intervals and furthermore in an interval substantially equal to such a time period required to switch a single frame of a switch unit.

In this case, a frame "A" sent from the terminal A is saved into an input buffer (port) for the terminal A employed in the switching hub, whereas a frame "B" sent from the terminal B is saved into an input buffer for the terminal B. Then, the switch unit employed in the switching hub judges as to whether or not the frames are saved into the respective input buffers in the round robin manner. When the frame is saved in the input buffer, the frame saved in this input buffer is supplied to an output buffer (namely, port; only one port being shown in this drawing) corresponding to the destination address within the frame. As a consequence, as schematically illustrated in FIG. 22, the frame B in the sound system would be delayed within the switching hub (namely, frame interval 1' would be widened, as compared with frame interval 1). Further, there is such a fact that a total number of frames derived from the respective input buffers per unit time is not controlled in accordance with a total number of frames entered into the respective input buffers. As a result, as indicated in the input buffer for the frame A, the input buffer contains no empty region, so that the frame A would be discarded.

Since the data drops are not allowed in the communication in the data system, when the frame A is discarded, the data is retransmitted. In other words, in such a case that the frame is discarded in the communication in the data system, in order to communicate such data having a certain size, a network resource is used by which data having a larger size than this size by several tens percent is transmitted. On the other hand, even if the data drops more or less occur, it is possible to recognize the contents of this communication in the data receiving terminal during the communication in the sound system. However, when the data is delayed, it is practically difficult to recognize the contents of this communication.

As a consequence, in the conventional switch hub, the following communication quality control is required. That is, the switching operation of the frame A is carried out with a top priority in order not to discard the frame A even though the frame B is more or less discarded. Otherwise, it is desirable that the switching operation of the frame B can be carried out with a top priority in order not to delay the frame B by interrupting the communication of the frame A at an earlier stage. However, the conventional switching hub was not provided with such a communication quality control function.

Also, a router is required so as to form a network constituted by a plurality of LANs by combining the conventional hubs with each other, otherwise with employment of the VLAN function of the switching hub.

For example, as represented in FIG. 23, in order that a network constructed of two sets of LANs is constituted by employing two sets of the conventional switching hubs, a router must be provided between two sets of these switching hubs. In this case, the frames are switched at a high-speed along the terminals stored in the same switching hub, because this frame switching operation is carried out by such a simple process operation called as a "MAC address retrieving" operation. However, when a frame derived from one switching hub is transferred to the other switching hub, various sorts of algorithm processes of the upper-grade layer are performed between terminals, for instance, between the terminal A and the terminal E where the frame should be transmitted via the router. Since the time required for processing 1 frame by a router becomes very longer than the time required for processing 1 frame by a switching hub, normally 50 times long, the communication performance of the communication established between the LANs in the network constituted by employing the conventional switching hubs would be considerably lowered, as compared with that for the communication established within the LAN. In other words, in this network, the high-speed characteristic of the switching hub could not be utilized in the communications established between the LANs.

SUMMARY OF THE INVENTION

Therefore, a first object of the present invention is to provide a switching hub capable of controlling a communication quality.

A second object of the present invention is to provide a switching hub capable of realizing a high-speed communication established between LANs.

To achieve the first object, in accordance with the present invention, a switching hub is arranged by a plurality of input/output ports, a switch unit, and a service class table for storing thereinto a correspondence relationship between type information and a service class. It should be noted that this switching hub is used in combination with a terminal for transmitting/receiving a frame having a type information field into which type information indicative of a type of data is set.

The switch unit is connected to the plurality of input/output ports so as to execute a switching of a frame supplied from each of the input/output ports based upon the information contained in this frame.

Each of these input/output ports contains a buffer memory, a management information memory, a receiving unit, a storage control unit, and a read-out control unit. The receiving unit is used to receive the frame, and the buffer memory is used to store the frame. The management information memory stores thereinto a plurality of combined information constituted by storage region information indicative of a region of the buffer memory and by the service class in such a format by which a relative sequence of storing the respective combined information can be recognized, and the storage region information is used to store the frame.

The storage control unit is operated by which when the receiving unit receives the frame, a region of the buffer memory capable of storing the frame is specified based upon the storage region information stored in the management information memory. Then, the frame is stored into the specified region. Furthermore, the storage control unit stores (adds) combined information constructed of storage region information indicative of the specified region and a service class related to type information set into a type information of the frame in the service class table to the management information memory.

The read-out control unit is operated by which when the read-out control unit is selected by the switch unit, combined information related to a service class capable of satisfying a predetermined condition and furthermore lastly stored is specified from the combined information stored in the management information memory. Then, the read-out control unit supplies a frame stored in a region of the buffer memory designated by storage region information contained in the specified combined information to the switch unit, and deletes the specified combined information stored in the management information memory.

In accordance with a first switching hub having the above-explained arrangement of the present invention, the communication quality control can be performed.

It should be noted that when the first switching hub is arranged, it is also possible to employ the following unit as the storage control unit. That is, in the case that the frame received by the receiving unit corresponds to a frame to which a service class field is not attached, the storage control unit stores into the buffer memory, such a frame formed by attaching a service class field to which a service class has been set, whereas in the case that the frame received by the receiving unit corresponds to a frame to which the service class field is attached, the storage control unit adds combined information having the service class set to the service class field, into the management information memory.

When a network is constituted by the first switching hub employing the storage control unit operable in the above manner, in each of the switching hubs provided on the communication path from the frame transmitting terminal to the frame receiving terminal, the communication quality controls can be commonly performed based on the information stored in the service class table equipped with the switching hub for storing the frame transmitting terminal. In other words, even if the contents of the service class tables employed in the respective switching hubs for constructing the network are not made equal to each other, the communication quality controls can be commonly performed.

It should be noted that when the first switching hub is realized, it is also possible to employ a table for storing the correspondence relationship between the type information and the service class with respect to each of the input/output ports as the service class table. In this case, as a storage control unit constituting each of the input/output ports, the storage control unit is employed which acquires the service class corresponding to the type information within the frame by using the correspondence relationship related to the own input/output port stored in the service class table.

To achieve the second object, a switching hub according to the present invention is arranged by employing a plurality of input/output ports, a switch unit, a LAN table, and a holding unit. The LAN table stores a combination among a LAN number equivalent to LAN discrimination information, a port number equivalent to discrimination information of the input/output ports, and an MAC address equivalent to discrimination information of a terminal. The holding unit holds an own LAN number equivalent to a unique LAN number. Each of the plurality of input/output ports includes a transmitting/receiving unit, a buffer memory, a recognizing unit, a reception frame adjusting unit, a buffer control unit and a transmission frame adjusting unit. The transmitting/receiving unit transmits and receives the frame. The buffer memory temporarily stores thereinto the frame received by the transmitting/receiving unit. The recognizing unit recognizes whether or not the transmitting/receiving unit is directly connected to the terminal. The reception frame adjusting unit sets to a destination LAN number field, predetermined information for indicating that a LAN number of a LAN to which a destination terminal belongs, is unknown in such a case that it has been recognized by the recognizing unit, when the transmitting/receiving unit receives a frame, that the transmitting/receiving unit is directly connected to the terminal, and produces and outputs to a transmission source LAN number field, a frame to which the own tag field to which the own LAN number held by the holding unit has been set, is added. Whereas, in such a case that the recognizing unit has recognized that the transmitting/receiving unit is not directly connected to the terminal, the reception frame adjusting unit outputs the received frame as it is.

The buffer control unit stores the frame outputted by the reception frame adjusting unit in the buffer memory. When the buffer control unit is selected by the switch unit, the buffer control unit supplies to the switch unit such a frame which has been lastly outputted by the reception frame adjusting unit. The transmission frame adjusting unit produces and supplies to the transmitting/receiving unit, such a frame made by removing the tag field from the supplied frame, in such a case that the recognizing unit has recognized that the transmitting/receiving unit is directly connected to the terminal. Whereas, in the case that the recognizing unit has recognized that the transmitting/receiving unit is not directly connected to the terminal, the transmission frame adjusting unit supplies the frame supplied from the switch unit directly to the transmitting/receiving unit.

The switch unit includes a selecting unity a first read-out trying unit, a first supplying unit, a second read-out trying unit, a second supplying unit, a third supplying unit, and a LAN table learning unit.

The selecting unit circulatably selects an input/output port to be processed from the plurality of input/output ports. The first read-out trying unit tries to read out from the LAN table, a port number and a LAN number corresponding to the destination MAC address set into the frame to be processed, which is equivalent to the frame supplied from the input/output port selected by this selecting unit. The first supplying unit supplies to the input/output port discriminated by the read-out port number, the frame to be processed in which this LAN number has been set to the destination LAN number field when both the port number and the LAN number are read out by the first read-out trying unit.

The second read trying unit tries to read out from the LAN table, a port number corresponding to the destination LAN number set into the destination LAN number field within the frame to be processed when both the port number and the LAN number are not read out by the first read-out trying unit. The second supplying unit supplies the frame to be processed to such an input/output port discriminated based on the read out port number when the port number is read out by the second read trying unit. The third supplying unit broadcasts the frame to be processed to all of such input/output ports possibly connected to a terminal which should receive this frame to be processed when the port number is not read by the second read trying unit.

The LAN table learning unit stores into the LAN table, a combination among a LAN number set to a transmission source LAN number field within the frame to be processed, a port number of the input/output port selected by the selecting unit, and a transmission source MAC address set into the frame to be processed when the frame is supplied by the first supplying unit or the third supplying unit.

When a network is constituted by employing the second switching hub with such an arrangement of the present invention, the router is no longer required. Accordingly, it is possible to realize a high-speed LAN communication.

When the second switching hub. of the present invention is realized, it is also possible to add a service class table for storing therein a correspondence relationship between the type information and the service class. In this case, as a reception frame adjusting unit corresponding to the structural element of the input/output port, the reception frame adjusting unit is employed which adds to the frame received by the transmitting/receiving unit, a tag field to which a service class has been set to the service class field, which corresponds to the type information set into the type information field within this frame, and is the service class table. Further, as a buffer control unit, the buffer control unit is employed which supplies to the switch unit, such a frame which has been lastly outputted by the frame adjusting unit and in which the service class set into the frame can satisfy a preselected condition among the frames stored in the buffer memory.

When the switching hub with such an arrangement is employed, it is possible to constitute such a network capable of performing the communication quality control and furthermore of realizing the high-speed LAN communication.

Further, when the second switching hub is manufactured, as a service class table, it is also possible to employ the following service class. That is, a service class table stores thereinto a service class made up of a first service class indicative of allowances with respect to a delay, and a second service class indicative of allowances with respect to a discard. In the case that such a service class table is employed, when the buffer control unit is selected by the switch unit, and a use ratio of the buffer memory is smaller than a predetermined value, the buffer control unit selects the frame which has been lastly outputted by the reception frame adjusting unit and then outputs the selected frame to the switch unit from the frames for indicating that the first service class is not highly allowable to the delay, stored in the buffer memory, whereas in the case that the use ratio of the buffer memory is larger than, or equal to the predetermined value, the buffer control unit selects the frame which has been lastly outputted by the reception frame adjusting unit and then outputs the selected frame to the switch unit among the frames for indicating that the second service class is not highly allowable to the discard, stored in the buffer memory.

If this switching hub is employed to form a network, when a traffic amount is small, the frame not allowable to the delay (e.g., frame in sound system) is processed with a top priority. When the traffic amount is increased, if there are great possibilities that the frames are discarded, then the frame not allowable to the discard (e.g., frame in data system) is processed with a top priority.

Incidentally, when the second switching hub is manufactured by employing the service class table for storing thereinto the service class made up of the first service class and the second service class, in the case that the use ratio of the buffer memory is lager than, or equal to the predetermined value, the buffer control unit may select such frames for indicating that the first service class is not highly allowable to the delay from the frames for indicating that the second service class is not highly allowable to the discard, stored in the buffer memory, and also select the frame which has been lastly outputted from the reception frame adjusting unit from the selected frames, whereby the buffer control unit supplies the lastly outputted frame to the switch unit.

Also, while the second switching hub is arranged, when the tag field is not contained in the frame received by the transmitting/receiving unit, the recognizing unit may be the one which recognizes that the transmitting/receiving unit is directly connected to the terminal, whereas when the tag field is contained in the frame received by the transmitting/receiving unit, the recognizing unit may be employed which recognizes that the transmitting/receiving unit is not directly connected to the terminal.

Furthermore, the second switching hub of the present invention may further comprises; an address table for storing thereinto a correspondence relationship between a port number and an MCA address, related to all of the input/output ports directly connected to the terminal; a zero-th read-out trying unit for trying read-out from the address table, a port number corresponding to the destination MAC address set into the frame to be processed, which is supplied from the input/output port selected by the selecting unit; and a zero-th supplying unit by which when the port number is read out by the zero-th read-out trying unit, the frame to be processed is supplied to the input/output port discriminated by the read-out port number. In this case, however, the first read-out trying unit included in the switch unit functions when the port number is not read by the zero-th trying unit.

When the above-described arrangement is employed, since the amount of the information stored in the LAN table can be reduced, it is possible to reduce the hardware amount required to realize the LAN table. Also, since the LAN table can be retrieved at a high-speed, it is possible to realize a switching hub with a high-speed switching operation if this arrangement is employed.

Also, the second switch hub according to the invention may further comprise a generation information table for storing thereinto a correspondence relationship between generation information and the MAC address.

In this case, the reception frame adjusting unit adds a tag field containing a generation information field to the frame to be processed. Further, in such a case that a broadcast number is not set to a destination LAN number field of the frame to be processed, the third supplying unit broadcasts such a frame to be processed that the contents of the destination LAN number field and the contents of the generation information field are rewritten into generation information determined based upon the broadcast number and a predetermined sequence, and the third supplying unit registers a correspondence relationship between the determined generation information and a transmission source MAC address within the frame to be processed into the generation information table, and also in such a case that the broadcast number is not set to the destination LAN number field of the frame to be processed, the third supplying unit directly broadcasts the frame to be processed. In such a case that the broadcast number is set to the destination LAN number field within the frame to be processed, the zero-th read-out trying unit tries to read the generation information related to the transmission source MAC address set to the frame to be processed from the generation information table, and in such a case that generation information having the same contents as that of the generation information to be processed is read out which is equivalent to the generation information stored in the generation information field of the frame to be processed, the zero-th read-out trying unit discards the frame to be processed, and also in the case that generation information having different contents from that of the generation information to be processed and the generation information is not read, the zero-th read-out trying unit updates the content of the generation information table in such a way that the generation information is stored as generation information corresponding to the transmission source MAC address within the frame to be processed.

Even when a network having such a shape is arranged by employing this switching hub, in which the respective switching hubs receive a plurality of frames by broadcasting the frame by another switching hub, the frames produced by broadcasting the frames entered after the second frame are discarded in the respective switching hubs. In other words, if this second switching hub is employed, then it is possible to constitute the networks having any forms.

Also, when the second switching hub of the present invention is constituted, in the case that the frame outputted by the reception frame adjusting unit cannot be stored into the buffer memory, the buffer control unit may discard the outputted frame and one frame selected from the frames stored in the buffer memory, and also owns the destination MAC address set in the discarded frame as congestion generation data whereby the buffer control unit may produce a collision frame for notifying such a fact that congestion happens to occur to the terminal for sending out the frame, and also may supply the produced collision frame to the transmitting/receiving unit. When the frame to be processed corresponds to the collision frame, the zero-th read-out trying unit may delete data related to an MAC address indicative of the congestion generation data within the collision frame from the LAN table.

Also, while employing an address table, in such a case that a port number of an input/output port selected by the selecting unit is not stored into the address table, and also a port number of an input/output port to which the frame to be processed is supplied by the first supplying unit, or the third supplying unit is stored into the address table, the LAN table learning unit may store into the LAN table, a combination among the LAN number set into the transmission source LAN number field within the frame to be processed, the port number of the input/output port selected by the selecting unit, and the transmission source MAC address set into the frame to be processed. In such a case that the port number of the input/output port selected by the selecting unit is not stored into the address table, and also a port number of an input/output port to which the frame to be processed is supplied by the first supplying unit, or the third supplying unit is not stored into the address table, the LAN table learning unit may store into the LAN table, a combination between the LAN number set into the transmission source LAN number field within the frame to be processed, and the port number of the input/output port selected by the selecting unit.

When the LAN table learning unit operable in this manner is employed, it is possible to realize such a switching hub that the amount of information stored in the LAN table is low. That is, it is possible to realize the low-cost switching hub operable at a very high-speed.

Also, while employing the LAN table learning unit operable in the above manner, in the case that the destination MAC address set into the frame to be processed corresponds to such information indicative of a broadcast frame, the zero-th read-out trying unit may specify the input/output port possibly for communicating with a transmission source terminal of the frame to be processed based upon the destination MAC address and the information stored in the LAN table, and also zero-th read-out trying unit may broadcasts said frame to be processed to the specified input/output port. As a result, the switching hub may be constituted which can correspond to the broadcast frame of the upper rank protocol without increasing a traffic amount in waste.

Moreover, in such a case that the destination MAC address set into the frame to be processed corresponds to such information indicative of a broadcast frame, and also the type information set into the frame to be processed represents a protocol used to interrogate the MAC address, the zero-th read-out trying unit may broadcast the frame to be processed to the plurality of input/output ports irrelevant to the contents of the LAN table. As a result, the switching hub is obtained which can correspond to the protocol for inquiring the MAC address such as ARP.

BRIEF DESCRIPTION OF THE DRAWINGS

A more complete understanding of the teachings of the present invention may be acquired by referring to the accompanying figures, in which like reference numbers indicate like features and wherein:

FIG. 7 is an explanatory diagram for explaining an address table provided in the switching hub;

FIG. 8 is an explanatory diagram for indicating a service class table provided in the switching hub of the embodiment;

FIG. 12 is an explanatory diagram for explaining a LAN table employed in the switching hub of the embodiment;

DETAILED DESCRIPTION OF THE PREFERRED EMBODIMENTS

Referring now to drawings, a switching hub according to a preferred embodiment of the present invention will be explained in detail.

Figure 1:
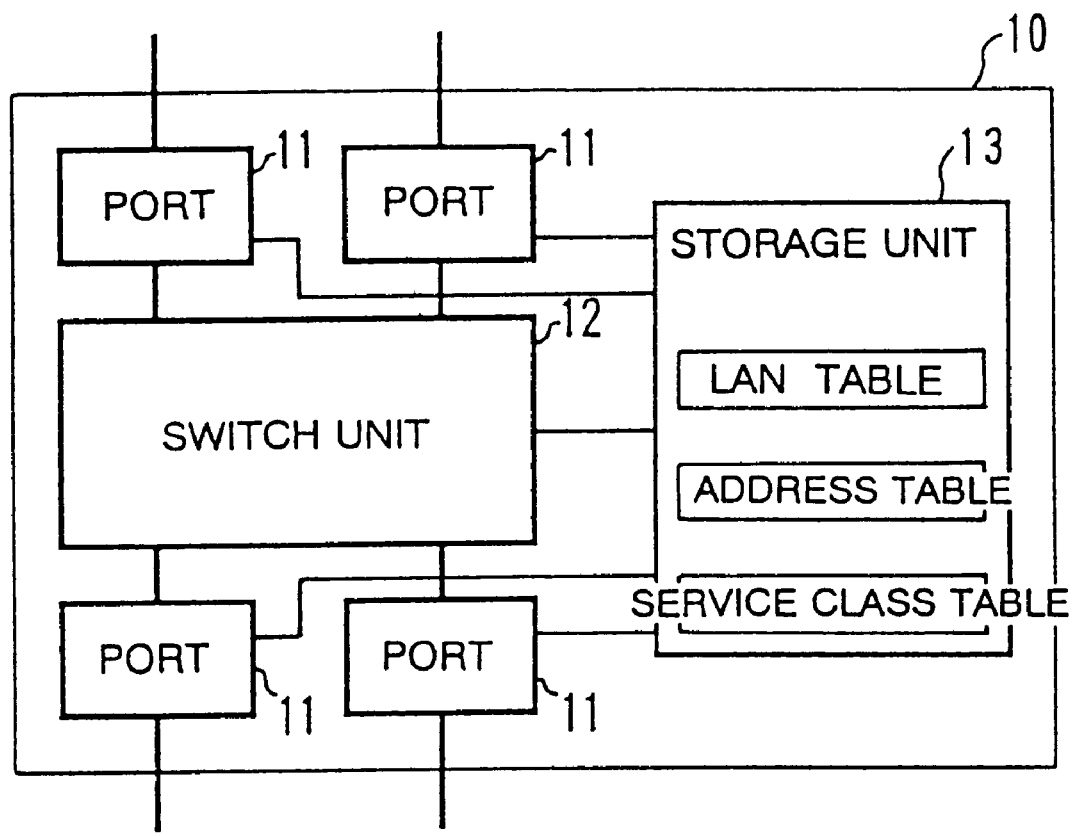
FIG. 1 is a block diagram for schematically showing an arrangement of a switching hub according to an embodiment of the present invention.

As represented in FIG. 1, a switching hub 10 according to an embodiment of the present invention is mainly arranged by a plurality of ports 11, a switch unit 12, and a storage unit 13 as a major structural element. The switching hub 10 according to the present embodiment is such an appliance used to perform a communication by using an Ethernet type frame. When a network capable of executing a LAN-to-LAN communication is constructed by employing this switching hub 10, a switching hub having the same structure as that of a terminal, or of the switching hub 10 is connected via a communication line to each of the ports 11.

The storage unit 13 is a memory accessed by the ports 11 and the switch unit 12. In this storage unit 13, a LAN table, an address table, a service class table, and a generation information table are stored. Also, the storage unit 13 stores therein a unique LAN number (own LAN number). It should be noted that although the actual switching hub 10 owns the VLAN function (namely, a plurality of LAN numbers can be set to the storage unit 13), it is now assumed that only one LAN number is stored into the storage unit 13 (all of terminals connected to switching hubs 10 belong to the same LAN), for the sake of simple explanation.

Although detailed contents of data stored in the respective tables employed in the storage unit 13 will be explained later, service classes corresponding to data for controlling a communication quality are stored in correspondence with the Ethernet type in a service class table. The service class table is set by a network manager before operation of the network is commenced (switching hub 10), and the contents of the service class table is utilized by the ports 11. Data utilized by the switch unit 12 are stored in a LAN table and an address table. After the operation of the network is commenced, the data is written into the LAN table by the switch unit 12 which switches the frame. Then, after the operation of the network is commenced, the data is written into the address table by the port 11 which receives the frame.

Subsequently, structures and operations of the respective units will now be explained in detail. First, a structure and an operation of each of the ports 11 employed in the switching hub 10 are described.

Figure 2:
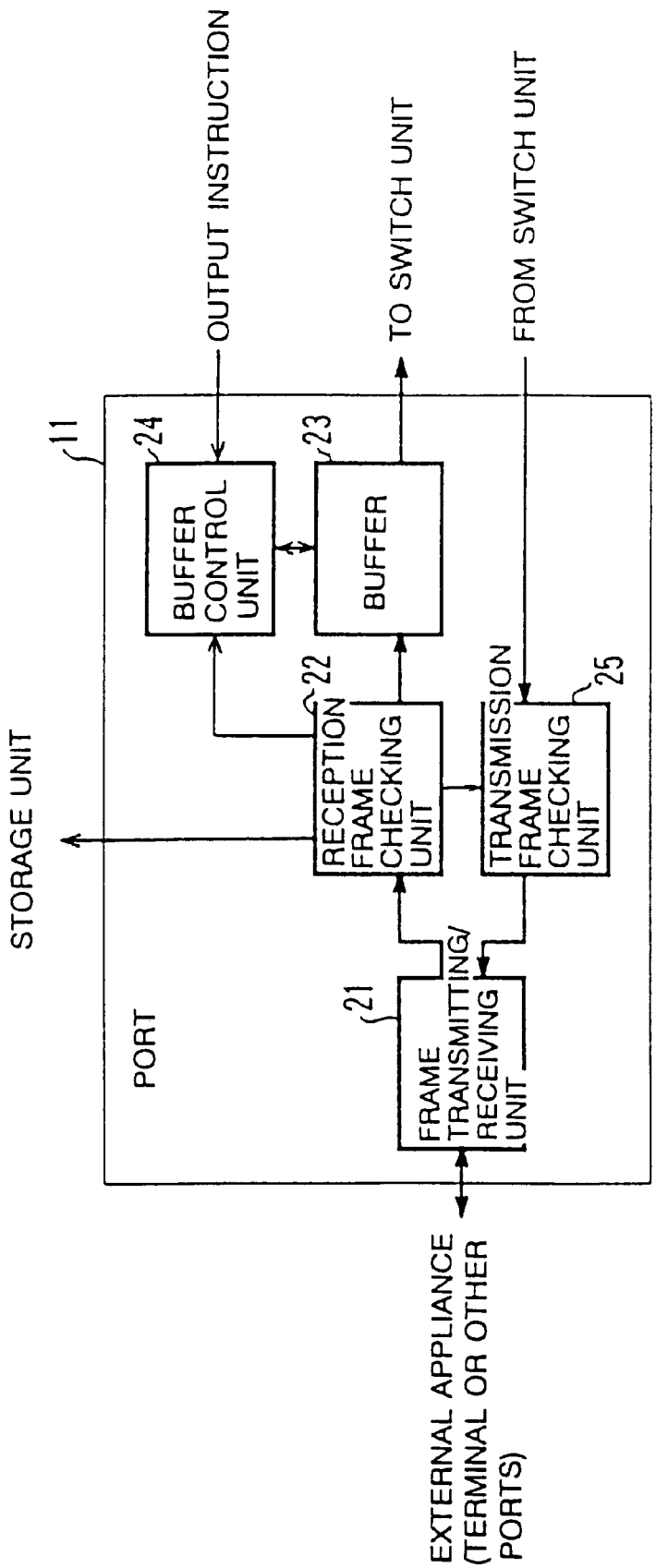
FIG. 2 is a block diagram for schematically indicating a port employed in the switching hub of the embodiment.

As indicated in FIG. 2, each of the ports 11 employed in the switching hub 10 is equipped with a frame transmitting/receiving unit 21, a reception frame checking unit 22, a buffer 23, a buffer control unit 24, and a transmission frame checking unit 25. The frame transmitting/receiving unit 21 is connected via a communication line to an external appliance (terminal, or port provided in another switching hub). When a frame is received, the frame transmitting/receiving unit 21 first converts a signal format of this frame, and thereafter supplies the format-converted frame to the reception frame checking unit 22. When a frame from the switch unit 12 is received via the transmission frame checking unit 25, the frame transmitting/receiving unit 21 first converts a signal format of this frame into a suitable format for the communication line, and thereafter sends out the format-converted signal to the communication line.

Figure 3:
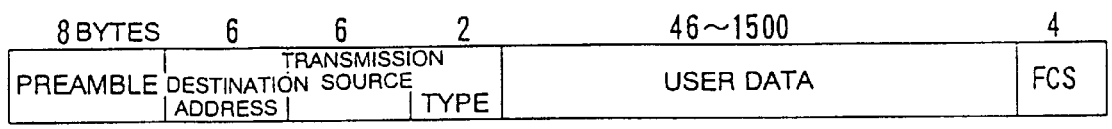
FIG. 3 is an explanatory diagram for indicating a frame (DIX specification) to be handled by the switching hub of the embodiment.
Figure 4:
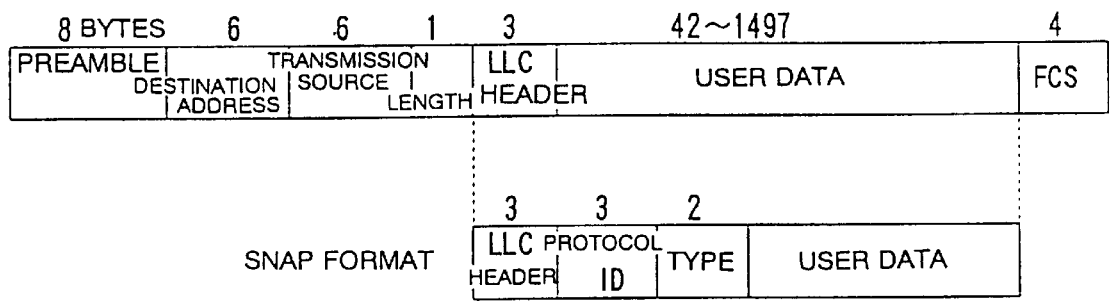
FIG. 4 is an explanatory diagram for indicating a frame (IEEE 802.3 specification) to be handled by the switching hub of the embodiment.

As previously explained, since the switching hub 10 is such a communication appliance by the frame having the Ethernet type, the frame transmitting/receiving unit 21 (port 11) directly connected to the terminal receives a frame having a field used to store the Ethernet type, as shown in FIG. 3, or FIG. 4. This field is a region indicated as "type" in the drawing, and this Ethernet type is an identifier indicative of a protocol of data stored in a user data field. It should be noted that the frame shown in FIG. 3 is a frame of the DIX specification, and the frame shown in FIG. 4 is a frame of the IEEE 802.3 specification with employment of the SNAP format.

Figure 5:
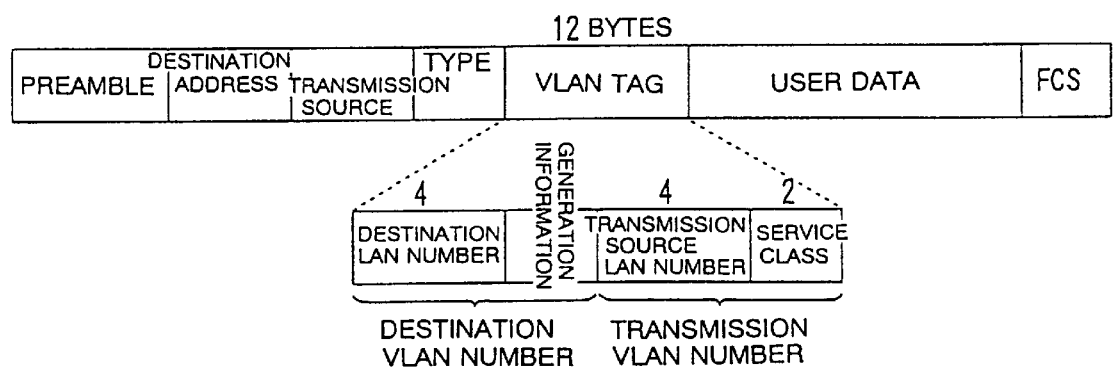
FIG. 5 is an explanatory diagram for indicating a frame attached with a VLAN tag exchanged between the switching hubs of the embodiment.

On the other hand, such a frame as shown in FIG. 5 is transmitted/received within the switching hub 10, or between two sets of switching hubs 10 in order to realize a high-speed communication and a communication quality control in response to a communication content (will be explained in detail). This frame is made by adding 12-byte information called as a VLAN tag to the frame from the terminal (will be referred to as a "frame with VLAN tag", or a "frame with tag" hereinafter). It should be understood that the frame with VLAN tag shown in FIG. 5 corresponds to the frame of FIG. 3. Meanings and usage of the respective data for constituting the VLAN tag will be explained later.

A circuit for producing such a frame with VLAN tag is equal to the reception frame checking unit 22 connected to the frame transmitting/receiving unit 21. As previously explained, the reception frame checking unit 22 (port 11) may be connected to the terminal, and also to a port employed in another switching hub. The reception frame checking unit 22 (port 11) commences its operation under such a condition that the reception frame checking unit 22 itself does not recognize whether the normal frame is received, or the frame with VLAN tag is received (namely, under such a state that this reception frame checking unit itself does not recognize whether the terminal is connected thereto, or another port is connected thereto).

Therefore, when the frame is received from the frame transmitting/receiving unit 21, the reception frame checking unit 22 judges whether or not this frame corresponds to the frame with VLAN tag. When this frame does not correspond to the frame with VLAN tag, the reception frame checking unit 22 adds the VLAN tag to the received frame and then supplies the VLAN tag-added frame to the buffer 23. When the frame with VLAN tag is received, the reception frame checking unit 22 directly supplies this frame with VLAN tag to the buffer 23. When the frame is supplied to the buffer 23, this reception frame checking unit 22 also executes a process operation for notifying information used to designate a managing sequence of this frame (namely, communication quality control sequence) to the buffer control unit 24. The buffer control unit 24 stores the frame to the buffer 23 by employing this information. The buffer control unit 24 determines one frame to be supplied to the switch unit 12 among the frames stored in the buffer 2 3 by using this information when an instruction for outputting a frame is received from the switch unit 12.

Figure 6:
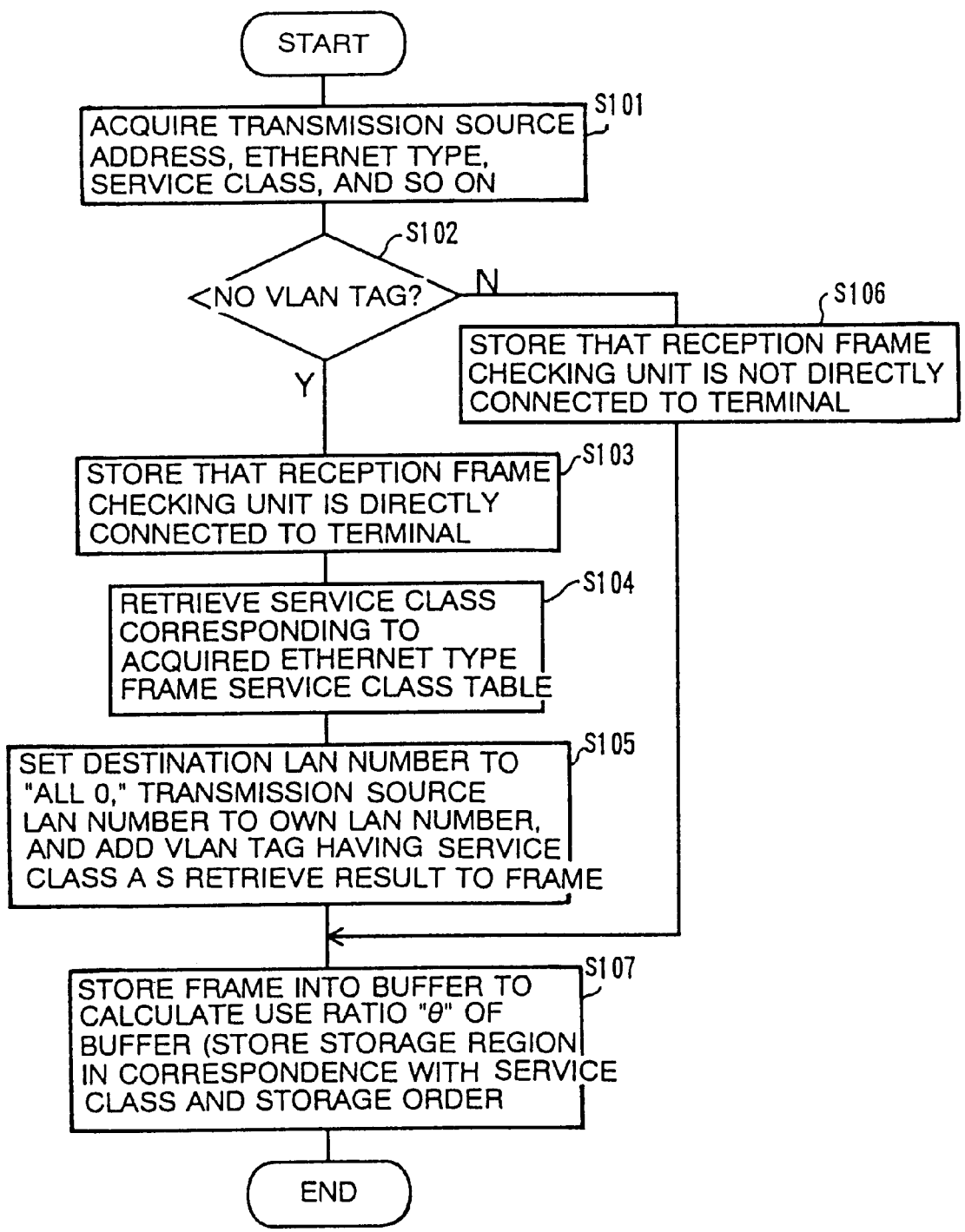
FIG. 6 is a flow chart for describing a sequential operation of the port employed in the switching hub of the embodiment when a frame is received.

Concretely speaking, as represented in FIG. 6, when the frame is received from the frame transmitting/receiving unit 21, the reception frame checking unit 22 judges whether or not this frame is equal to the frame with tag by reading a content of a head portion of this frame, and further acquires data which is required for executing the succeeding process operation (step S101). At this step S101, when the VLAN tag is not added to the frame, the reception frame checking unit 22 acquires an address of destination and the Ethernet type (see FIG. 3) which have been set in the frame. On the other hand, when the VLAN tag is added, the reception frame checking unit 22 acquires the destination address, the Ethernet type, and the service class (see FIG. 5) within the VLAN tag.

In the case that the frame from the frame transmitting/receiving unit 21 is not equal to the frame with tag ("Y" at step S102), the reception frame checking unit 22 stores such a fact that this reception frame checking unit 22 itself is directly connected to the terminal (step S103). At this step, the reception frame checking unit 22 also executes a process operation for setting, to an address table stored in the storage unit 13, such information for indicating that a terminal discriminated by the destination address acquired at the step S101 is stored. As schematically illustrated in FIG. 7, the address table is formed as a table with such a format that the port number can be retrieved by the MAC address. At the step S103, the reception frame checking unit 22 sets both a port number indicative of the own checking unit and the destination address (MAC address) acquired at the step S101 into the address table.

Next, the reception frame checking unit 22 retrieves a service class corresponding to the Ethernet type acquired at the step S101 from the service class table (step S 104).

As indicated in FIG. 8, the service class table is such a table for previously storing a relationship between the Ethernet types (SNA, IP, —) and the service classes (1·1, 5·1, —) constructed of the service class X and the service class Y. It should be understood that values indicated on right/left sides of symbol "·" correspond to the service class X and the service class Y, respectively.

As will be explained later, when the switching hub 10 is brought into such a state that the frame should be discarded, the switching hub 10 discards such a frame that the service class Y owns a large service class. Also, under the normal condition, the switching hub 10 switches in priority such a frame that the service class Y owns a small service. To this purpose, the network manager sets information into the service class table in such a way that before the operation of the switching hub 10 is commenced, the Ethernet types (IP, ARP etc.) allowable to a delay of a frame is related to the large service class X, and the Ethernet type (AUTOPHONE) allowable to a discard is related to the small service class Y.

After the service class table is retrieved, the reception frame checking unit 22 sets "all 0" as a destination VLAN number (destination LAN number+generation information), and sets the own LAN number as a destination LAN number, and further adds as the service class, such a VLAN that the service class retrieved at the step 104 has been set to a frame (step S105). It should be noted that the generation information set at this step will not be referred later (but will be referred after content is updated). As a consequence, although any values may be set at this step, as explained above, "0" is set in the switching hub 10 of this embodiment.

After a services of the above-explained process operation has been executed, the reception frame checking unit 22 notifies the service classes X and Y to the buffer control unit 24, and also supplies the produced frame with VLAN tag to the buffer 23.

In the case that the frame attached with the VLAN tag is received ("IN" at step 102), the reception frame checking unit 22 stores that the terminal is not directly stored (step S106), notifies the service classes X and Y within this frame to the buffer control unit 24, and also supplies the frame with the VLAN tag received from the frame transmitting/receiving unit 21 to the buffer 23.

On the other hand, upon receipt of the notification of the service classes X and Y, the buffer control unit 24 stores the frame into the buffer 23 to calculate a use ratio "θ" of the buffer (namely, a ratio of memory capacity used for storing frame to entire memory capacity) (step S107). It should also be noted that when the frame is stored into buffer at this step S107, the buffer control unit 24 stores into a built-in memory for management information, such information indicative of the storage region of the frame in such a manner that the relative storage sequence (namely, temporal storage sequence) among the frames corresponds to the service classes X and Y.

Although omitted from the drawing, there are some possibilities that the buffer control unit 24 may discard the frame supplied from the reception frame checking unit 22, or may discard another frame stored in the buffer 23 and also may store the frame supplied from the reception frame checking unit 22 at this step.

Concretely speaking, in such a case that no empty region capable of storing the frame supplied from the reception frame checking unit 22 cannot be found out by retrieving empty regions with employment of the information stored in the management information memory, the buffer control unit 24 specifies maximum values of the service classes Y related to the respective frames stored in the management information memory, and then compares the specified maximum values with the dimension of the service class Y notified from the reception frame checking unit 22 at a step S107. Then, when this maximum value is smaller than, or equal to the dimension of the notified service class Y, the frame presently supplied from the reception frame checking unit 22 is discarded.

On the other hand, when this maximum value is larger than the dimension of the notified service class Y, the buffer control unit 24 specifies as the service class Y, a frame which owns a maximum value and has been latest stored. Subsequently, the specified frame is deleted from the buffer 23, and the presently given frame is stored into the buffer 23.

In other words, the buffer control unit 24 discards such a frame greatly allowable to a discard (namely, service class Y is large) when no empty region capable of storing the frame supplied from the reception frame checking unit 22 can be found out.

Moreover, when the frame is discarded, the buffer control unit 24 instructs the transmission frame checking unit 25 to send out a collision signal frame with respect to the destination of the discarded frame (will be described later in detail).

Figure 9:
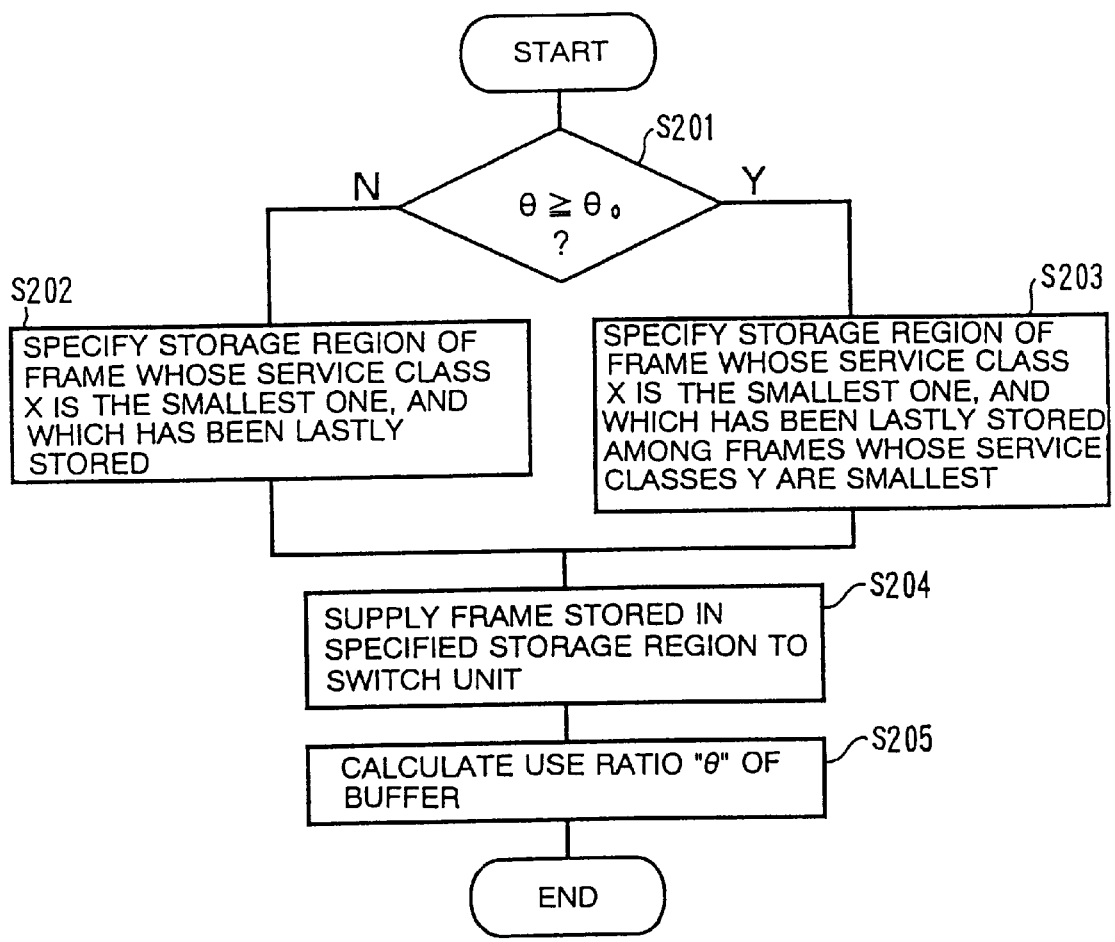
FIG. 9 is a flow chart for describing a sequential operation of the port employed in the switching hub of the embodiment when a frame is supplied to a switch unit.

When the buffer control unit 24 receives the frame output instruction from the switch unit 11, this buffer control unit 24 is operated in accordance with a sequential operation defined in a flow chart of FIG. 9, so that one frame stored in the buffer 23 is supplied to the switch unit 11.

In other words, upon receipt of the frame output instruction, the buffer control unit 24 firstly judges whether or not the use ratio "θ" of the buffer is greater than, or equal to a preselected threshold value "$\theta_0$" (step S201). Then, in the case of $\theta < \theta_0$ ("N" at step S201), the buffer control unit 24 specifies a storage region for a frame based on the information stored in the management information memory. This frame has been stored earliest into the buffer 23, to which the smallest service class X is related (step S202). Conversely, in the case of $\theta \geq \theta_0$ ("Y" at step S201), the buffer control unit 24 specifies a storage region for a frame based on the information stored in the management information memory (step S203). This frame corresponds to a frame to which the smallest service class X is related among the frames to which the smallest service class Y is related, and also which has been stored earliest into the buffer 23.

Then, the buffer control unit 24 supplies the frame with VLAN tag stored in the storage region specified at the step S202 or the step S203 to the switch unit 12 (step S204). Next, the value of the use ratio θ of the buffer is updated (step S205), and then the process operation shown in the drawing is accomplished.

As explained above, when there is a sufficiently empty region in the buffer 23 ($\theta < \theta_0$), the buffer control unit 24 supplies the frame, the value of the service class X of which is small, namely the frame not allowable to the delay, to the switch unit 12 with a top priority. Then, under such a condition that the frame discard will occur ($\theta \geq \theta_0$), the frame where the value of the service class Y is small, namely the frame not allowable to the discard, is supplied to the switch unit 12 with a top priority. As a result, since the frames allowable to the discard are left in the buffer 23, these frames allowable to the discard may be discarded in the switching hub 10 of the embodiment when the above-described frame discard is carried out.

When the transmission frame checking unit 25 is instructed to send out the collision signal frame from the buffer control unit 24, this transmission frame checking unit 25 supplies to the frame transmitting/receiving unit 21, such data used to transmit a collision signal frame having a destination address within the frame to be discarded as congestion occurrence destination address data, to which the transmission source address within this frame to be discarded has been set as the destination address.

Also, when the frame (continuously attached with tag) is supplied from the switch unit 11, the transmission frame checking unit 25 removes the VLAN tag from this frame and produces the frame with the normal format in the case that a confirmation is made by the reception frame checking unit 22 that this transmission frame checking unit 25 is directly connected to the terminal. Then, this frame with the normal format is supplied via the frame transmitting/receiving unit 21 to the terminal. On the other hand, when the reception frame checking unit 22 has recognized that this transmission frame checking unit 25 is not directly connected to the terminal, this reception frame checking unit 22 directly supplies the frame with tag derived from the switch unit 11 via the frame transmitting/receiving unit 21 to another switching hub.

Figure 10:
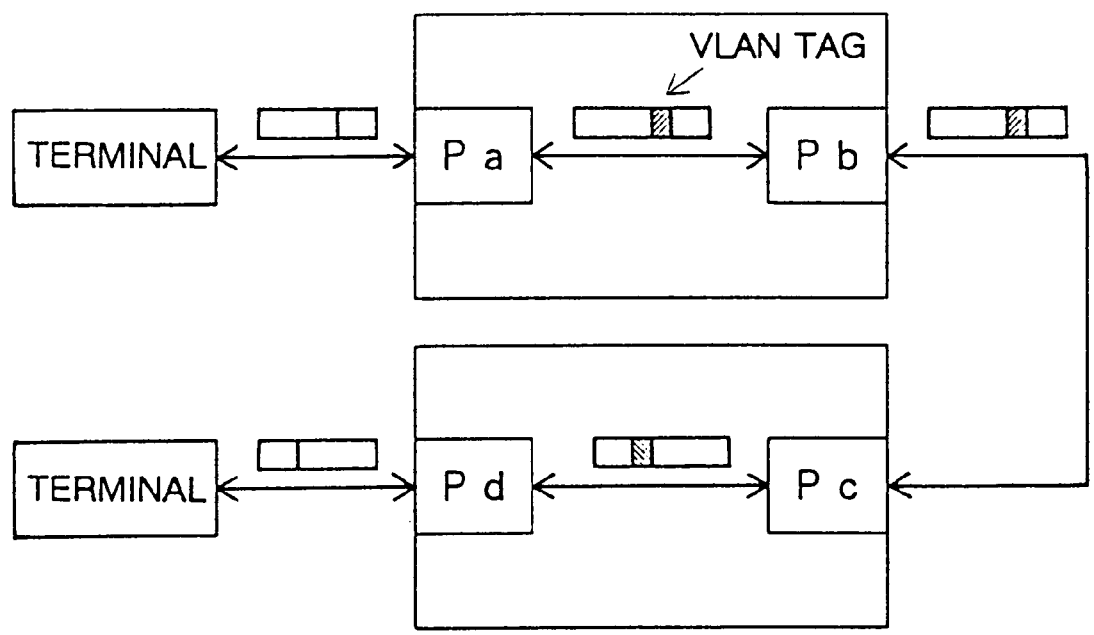
FIG. 10 is an explanatory diagram for explaining a frame exchanging sequence executed in a network formed by combining the switching hubs of the embodiment.

As previously described, the respective ports 11 employed in the switching hub 10 are arranged so as to be operated in the different manners, depending upon whether or not the respective ports are connected to the terminal. As a consequence, as schematically illustrated in FIG. 10, in such a network constructed by combining these switching hubs 10, the frame with the normal format may be transmitted/received between the terminal and the switching hub, whereas the frame with tag may be transmitted/received between the switching hubs.

Now, operations of the switch unit 12 will now be explained.

The switch unit 12 sequentially (every time process operation for one frame is ended) issues a frame output instruction in the round robin format with respect to a plurality of ports 11 managed by this switch unit 12.

Figure 11:
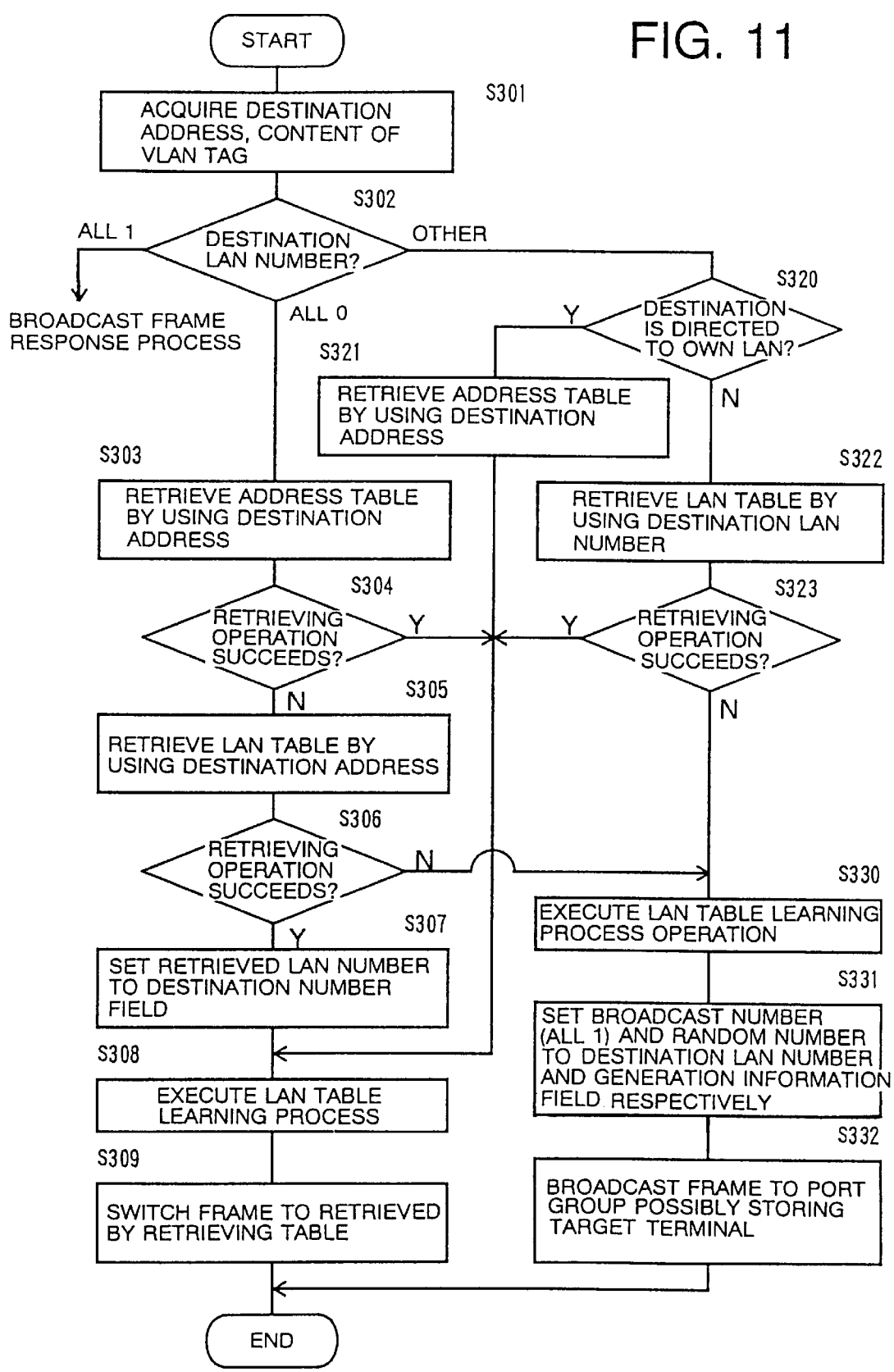
FIG. 11 is a flow chart for describing an overall sequential operation of the switch unit provided in the switching hub of the embodiment.

When a frame is supplied from the port 11 to which the frame output instruction is issued, the switch unit 12 first acquires both a destination address (MAC address) contained in this frame and a content of a VLAN tag (destination LAN number, transmission source LAN number), as represented in FIG. 11 (step S301).

In the case that the destination LAN number is "all 1" (step S302; all 1), the switch unit 12 executes a process operation called as a "broadcast frame response process operation". The content of the broadcast frame response process operation will be described later in detail. This process operation is not equal to such a process operation for accepting a broadcast frame by an upper grade protocol, but equal to a process operation accepting a broadcast frame used when a position of a terminal by which the frame should be received is not recognized. For instance, this switching hub 10 may also be arranged such that the upper grade protocol for broadcasting the data can be supported. A process operation prepared for this support (will be referred to as a "support process" hereinafter) will be explained later. Although omitted from the drawing, the judgement as to whether or not the support process operation is executed may be carried out by judging whether or not the destination address (not equal to destination LAN number) within the frame is equal to "all 1" between the step S301 and the step S302.

Now, when the address LAN number acquired at the step S301 is equal to "all 0" (step S302; all 0), the switch unit 12 first retrieves the address table by employing the destination address acquired at the step S301, so that the switch unit 12 tries to read out the port number (step S303). Then, when the retrieving operation of the address table is carried out successfully ("Y" at step S303), namely when the port number corresponding to the destination address can be read out, the frame is switched to the port 11 identified based on this port number (step S309), and then the process operation is accomplished.

On the other hand, when there is no data related to the destination address within the address table ("N" at step S304), the switch unit 11 retrieves the LAN table by using the destination address (step S305).

As shown in FIG. 12, the LAN table is constituted by such a table that a certain number ("0" in a specific case) of MAC addresses are stored in combination with the port number and the LAN number. At the step S305, the switch unit 12 tries to read out the LAN number and the port number corresponding to the destination address (MAC address) from this LAN table.

In the case that both the LAN number and the port number can be read out ("Y" at step S306), the switch unit 12 sets the retrieved LAN number to the destination LAN number field to which "all 0" have been set (step S307). Then, a LAN table learning process operation is carried out (step S308).

The LAN table learning process operation corresponds to such a process operation that information related to a connection condition with respect to another LAN given by the frame for presently performing switching (broadcast) is added to the LAN table. Basically, the LAN table learning process operation is carried out in accordance with the below-mentioned sequence.

First, the switch unit 12 makes a confirmation that a transmission source LAN of a frame to be processed corresponds to another LAN. In the case that the transmission source LAN corresponds to the own LAN, the switch unit completes the LAN table learning process operation without changing the content of the LAN table. In the case that the transmission source LAN corresponds to another LAN, the switch unit judges whether or not the frame to be processed is used for another LAN. That is, the switch unit judges whether the frame to be processed is supplied to another switching hub, or supplied to the terminal belonging to the own LAN. Then, in the former case, the switch unit registers a combination between the port number of the port from which the frame to be processed is derived and the transmission source LAN number set into the frame to be processed into the LAN table. On the other hand, in the later case, the switch unit registers into the LAN table, such a combination among the port number of the port from which the frame to be processed, the transmission source LAN number set into the frame to be processed, and the transmission source address.

After the switch unit executes the LAN table learning process operation in such a sequential operation, this switch unit switches the frame to the port specified by retrieving the table (step S309), and the process operation shown in the drawing is accomplished.

In such a case that there is no data having the destination address during the LAN table retrieving operation defined at the step S305 ("N" at step S306), after the LAN table learning process operation has been executed by the switch unit 12 (step S330), this switch unit 12 sets the broadcast number ("all 1") and the random number generated by using a predetermined algorithm to the destination LAN number field and the generation information field of the frame to be processed, respectively (step S331). Then, the switch unit broadcasts the frame to such a port group having a certain possibility that a terminal (target terminal) discriminated by the destination address is stored (step S322), and then the process operation is ended. This port group corresponds to such a port group that the port number is not stored in the address table.

Also, in such a case that the destination LAN number acquired at the step S301 is neither equal to "all 1", nor equal to "all 0" (others: step S302), the switch unit 11 judges whether or not this destination LAN number is made coincident with the own LAN number, namely judges whether or not the destination of this frame is directed to the own LAN (step S320). When the destination of this frame is directed to the own LAN ("Y" at step S320), the switch unit 12 retrieves the address table by using the destination address so as to specify the port (port number) for storing the terminal discriminatable by this destination address (step S321). Then, the process operation is advanced to the step S308 at which the previously explained process operation is executed.

On the other hand, when the destination of this frame is not directed to the own LAN ("N" at step S320), the switch unit tries to specify the port number of the port for storing the target terminal by retrieving the LAN table by using the destination LAN number (step S322). Then, when the port number can be retrieved, after the LAN table learning process is executed at the step S308, the switch unit switches the frame to the retrieved port (step S309), and then the process operation is accomplished. When the switch unit fails in the retrieving operation of the port number from the LAN table ("N" at step S323), the process operation is advanced to the step S330 at which the previously explained process operation is executed.

Figure 13:
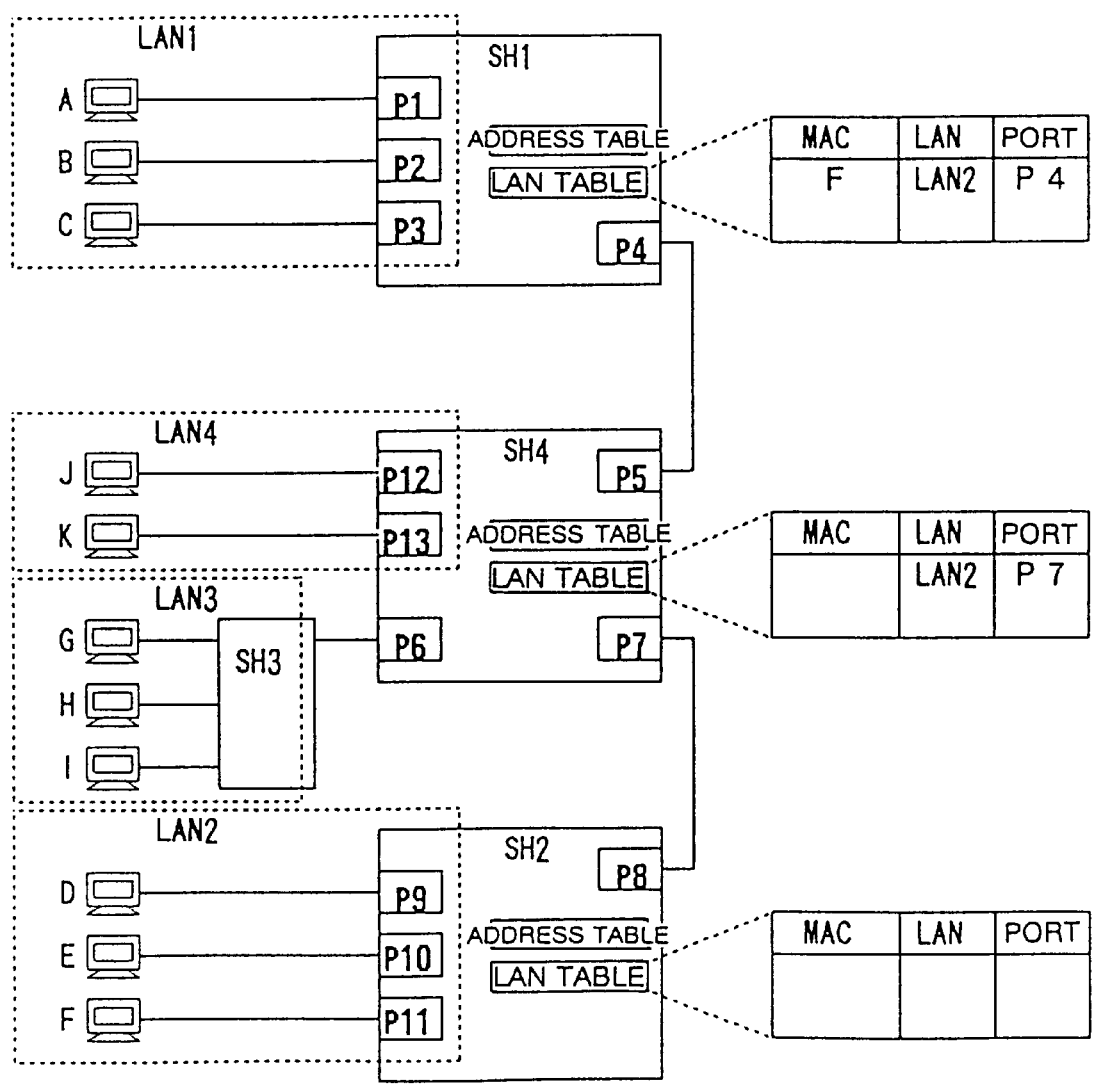
FIG. 13 schematically represents an example of a network constituted by the switching hubs of the embodiment.

As represented in FIG. 13, a network is constituted by four sets of switching hubs SH1 to SH4, and a terminal "A" to a terminal "I" having MAC addresses "A" to "I" respectively. An additional operation of the switch unit 12 will now be explained with reference to such an example that when contents of LAN tables employed in the switching hubs SH1, SH4, SH2 are given as illustrated in FIG. 13, the terminal "A" belonging to the LAN 1 sends out a frame (namely, frame having destination address F and transmission source address A) to the terminal "F" belonging to the LAN 2. This case corresponds to such a case that the terminal "A" which receives the frame sent from the terminal "F" responds to this terminal "F".

In this case, a port P1 receives a frame to which no VLAN tag is attached from the terminal "A". As a consequence, the port P1 adds such a VLAN tag that the destination LAN number is set to "all 0" and the transmission source VLAN number is set to "LAN1" to this frame, and then supplies the frame to which this VLAN tag has been added to a switch unit (not shown in detail) employed in the switching hub SH1.

At the step S301, the switch unit to which such a frame with the VLAN tag has been supplied recognizes that the destination address is "F", and the destination LAN number is "all 0". Accordingly, at the step S302, the process operation is advanced to a branch of the "all 0" side. Then, at the step S303, the switch unit tries to read out a port number corresponding to the destination address "F" from the address table.

Since the terminal "F" corresponds to the terminal stored in the switching hub SH2, there is no data related to the MAC address "F" in the address table contained in the switching hub SH1. As a result, the switch unit tries to read out the LAN number and also the port number, corresponding to the destination address derived from the LAN table (step S305). In this case, since a LAN number "LAN 2" and a port number "P4" are stored in correspondence with the MAC address "F" in the LAN table, the switch unit sets the LAN number "LAN 2" to the destination LAN number field where the destination LAN number is "all 0" (step S307). Then, since the transmission source LAN is equal to the own LAN, the switch unit supplies this frame to the port P4 without updating the LAN table (step S309).

Since the port P4 received the frame with VLAN tag in the port (data related to P4 is present in LAN table), the port P4 recognizes that this port P4 itself is not connected to the terminal. As a consequence, the port P4 sends out the frame supplied from the switch unit 12 to the line without removing the VLAN tag.

The frame (namely, frame with VLAN tag) sent out from the port P4 is supplied via the port P5 provided in the switching hub SH4 to the switch unit employed in this SH4. As previously explained, this frame stored in (the buffer of) the port P5 is managed by employing the service classes X and Y set into the VLAN tag in the switching hub SH1.

At the step S301, the switch unit employed in the switching hub 4 acquires a destination address "F" and a destination LAN number "LAN2". As a consequence, the process operation is advanced to a step S320 at which the switch unit judges whether or not the destination is directed to the own LAN (namely, "LAN 4"). In this case, since the destination is directed to other LAN, the process operation by the switch unit is branched to "N" side at the step S320. Then, at a step S322, the switch unit retrieves the LAN table by using the destination LAN number "LAN2" to thereby obtain a port number "P7".

Figures 14, 15, 16:
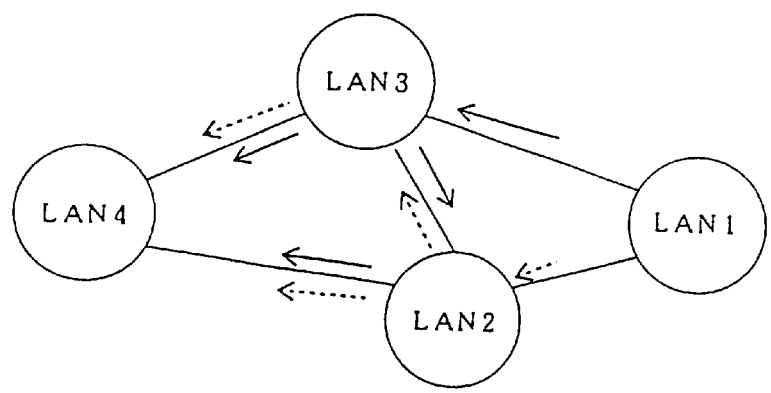
FIG. 14 is an explanatory diagram for explaining a LAN table employed in the switching hub SH4 shown in FIG. 13 after a frame derived from a terminal A has been sent out to the switching hub SH2.
FIG. 15 is an explanatory diagram for explaining a LAN table employed in the switching hub SH2 in the network shown in FIG. 13 after a frame derived from a terminal A has been sent out to a terminal F.
FIG. 16 is an explanatory diagram for explaining an object of broadcast frame response process operation.

Subsequently, the switch unit executes the LAN table learning process operation. Since the transmission source LAN is equal to another LAN and further the port P7 is not equal to such a port to which the terminal is directly connected, the switch unit stores a corresponding relationship between the transmission source LAN number "LAN1" and the port number "P5" of the port for receiving the frame into the LAN table employed in the own switching hub. In other words, since the frame is directed to another LAN, the switch unit does not register the MAC address to the LAN table, but changes the content of the LAN table provided within the switching hub 4, as represented in FIG. 14. Thereafter, the switch unit supplies the frame to the port P7 specified by the retrieving operation.

The port P7 and also the port P8 provided in the switching hub SH2 are operated in a similar manner to those of the port P4 and the port P5, respectively. As a result, the frame (destination LAN number="LAN2", destination address= "F"), which has been outputted to the port P8 by the switch unit employed in the switching hub SH4 is directly supplied to the switch unit employed in the switching hub SH2.

Since the destination LAN number is neither equal to "all 0", nor equal to "all 1", the switch unit employed in the switching hub SH2 executes the process operation defined at the step S320. Then, the switch unit recognizes that the destination is directed the own LAN at the step S320. As a consequence, the switch unit executes the process operation defined at a step S321, not at a step S322. In other words, the switch unit reads out the port number corresponding to this destination address from the address table contained in the switching hub 2 by using the destination address set to the frame. In this case, since a port number "P11" is read out, the switch unit supplies the frame with VLAN tag to the port P11 discriminated by this port number.

Also, since the transmission source LAN corresponds to another LAN, the switch unit provided in the switching hub SH2 also updates the LAN table (step S308). At this time, since the destination LAN is equal to the own LAN, the switch unit registers the MAC address to the LAN table. That is, the switch unit changes the content of the LAN table stored in the switching hub SH2 into those shown in FIG. 15.

Since the port P11 corresponds to such a port that the own port directly stores the terminal, when the frame is supplied from the switch unit, this port P11 removes the VLAN tag from this frame. Then, the port P11 transmits to the terminal "F", a frame having the normal format, from which the VLAN tag has been removed.

As previously described, in the case that the frame sent from a certain terminal (terminal "F" in FIG. 13) has reached a communication destination terminal (terminal "A"), in the network constituted by employing the switching hub 10, the frame sent from the communication destination terminal reaches such a terminal that the communication to this communication destination terminal is commenced without broadcasting.

Next, considering such a case that a frame is transmitted from the terminal "A" to the terminal "D" under the condition of FIG. 13 (namely, under such a state that no communication from terminal D to terminal A was carried out in the past).

In this case, similar to the above-described case, the port P1 adds such a VLAN tag that the destination LAN number is set to "all 0" and the transmission source VLAN number is set to "LAN1" to the frame supplied from the terminal A, and then supplies this frame with VLAN tag to the switch unit within the switching hub SH1.

The switch unit to which such a frame with VLAN tag has been supplied may recognize at the step S301 that the destination address is equal to "D", and the destination LAN number is equal to "all 0". As a result, at the step S302, the process operation is branched to the "all 0" side. At the next step S303, the switch unit tries to read the port number corresponding to the destination address "D" from the address table. Since the terminal D is the terminal stored in the switching hub SH2, there is no data related to the MAC address "D" in the address table contained in the switching hub 1.

As a result, the switch unit tries to read the LAN number and the port number corresponding to the destination address derived from the LAN table (step S305). In this case, since there is no data related to the MAC address "D" within the LAN table, the switch unit executes the process operation defined after the step S310. In other words, the switch unit sets the broadcast number "all 1" and the random number to the destination LAN number field and the generation information field, respectively, and then broadcasts this frame to such a port group possibly containing the target terminal. In this case, since the port possibly containing the target terminal is only the port P4, the switch unit supplies the frame to which the broadcast number has been set only to the port P4.

As a result of the operations by the ports P4 and P5, the frame which has been supplied from the switch unit employed in the switching hub SH1 to the port P4 is supplied as it is to the switch unit employed in the switching hub 4. As a consequence, the switch unit employed in the switching hub 4 branches the process operation to the "all 0" side, and then commences the broadcast frame response process operation.

Subsequently, a description will now be made of the broadcast frame response process operation. First, a response process operation for broadcasting will now be summarized.

As previously explained, when the switch unit provided in this switching hub 10 cannot recognize the port to which the frame should be supplied, this switch unit supplies such a frame to which the broadcast number "all 1" has been set as the destination LAN number to the respective ports possibly having the target terminals.

In this case, it is assumed that the switching hub is constituted in such a manner that when such a frame to which the broadcast number "all 1" has been set as the destination LAN number is received, a similar process operation when the broadcast number "all 0" has been set as the destination LAN may be carried out. Considering now such a case that, as represented in FIG. 16, a mesh-shaped (a shape where there are two terminals through which a plurality of routes are utilizable) network is fabricated by employing such a switching hub.

At this time, when the terminal belonging to LAN1 sends out the frame to the terminal belonging to LAN 4, as indicated by an arrow shown in this drawing, the frame having the same content is transmitted from LAN1 to LAN3 and LAN4 respectively. Then, the frame having the same content is sent out from LAN3 which has received the frame from LAN1, to LAN2 and LAN4. Similarly, since the frame is transmitted from LAN2 to LAN3 and LAN4, four sets of the frames would arrive at LAN4.

The broadcast frame response process operation is such a process operation capable of preventing an occurrence of such a phenomenon. During this broadcast frame response process operation, the switch unit is operated in accordance with flow charts shown in FIG. 17 and FIG. 18.

Figure 17:
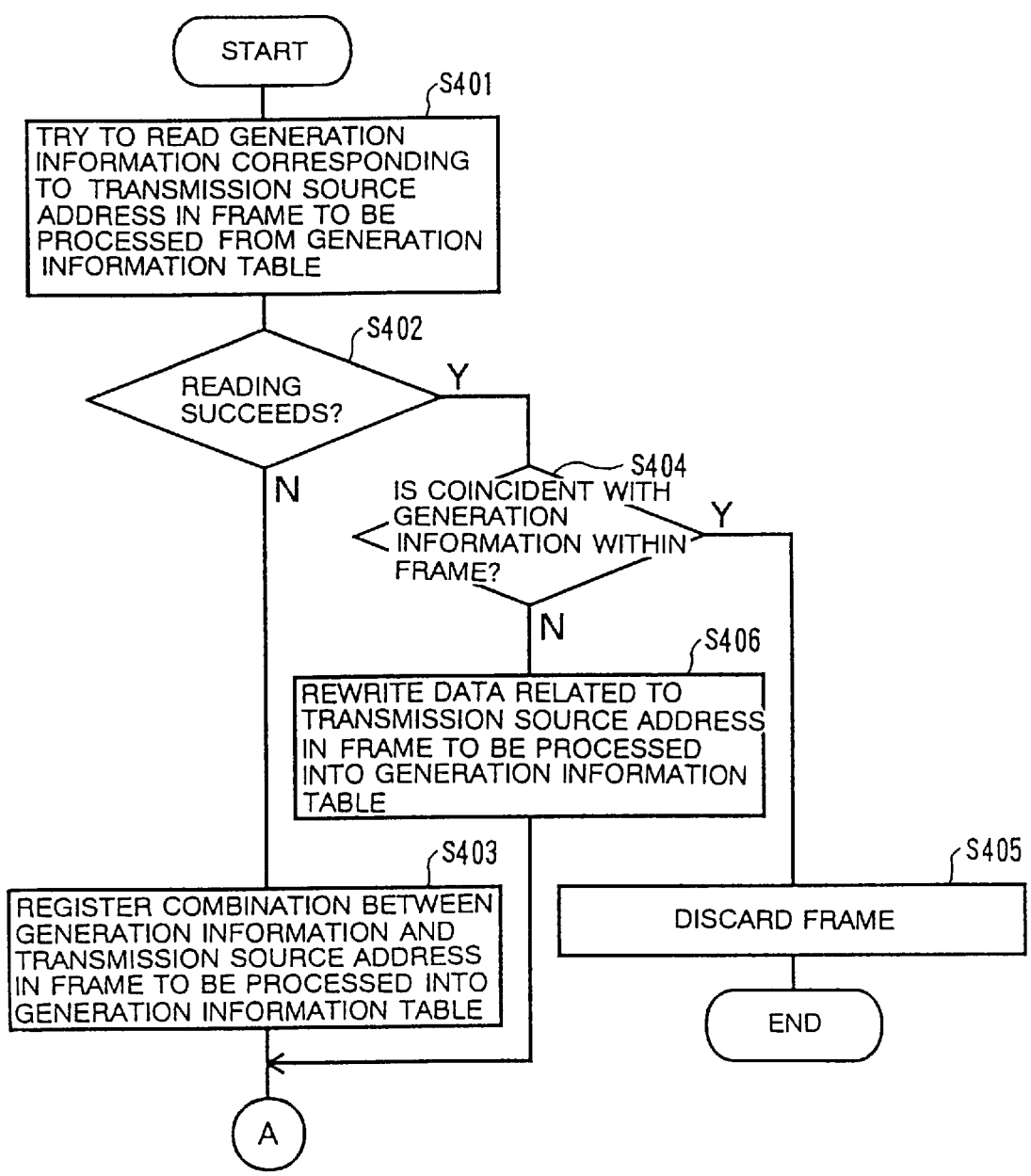
FIG. 17 is a first flow chart for describing a sequential operation of the switch unit during the broadcast frame response process operation.

As shown in the flow chart of FIG. 17, the switch unit first tries to read out generation information corresponding to the transmission source address (acquired at step S301) from the generation information table (step S401). It should be noted this generation information table is such a table used to store a corresponding relationship between the transmission address contained in the received broadcast frame and the information (namely, random number set at step S331) set in the generation information field. A generation information table employed in a switching hub in which the broadcast frame response process operation has not yet been once executed will constitutes a table for storing no information.

In the case that no data related to the transmission source address is stored in the generation information table ("N" at step S401), the switch unit registers into the generation information table, a combination between the transmission source address and the generation information (random number), which have been set into the frame to be processed (step S403). Then, a process operation for specifying a port to which this frame is supplied (see FIG. 18, will be discussed later) is commenced.

Figure 18:
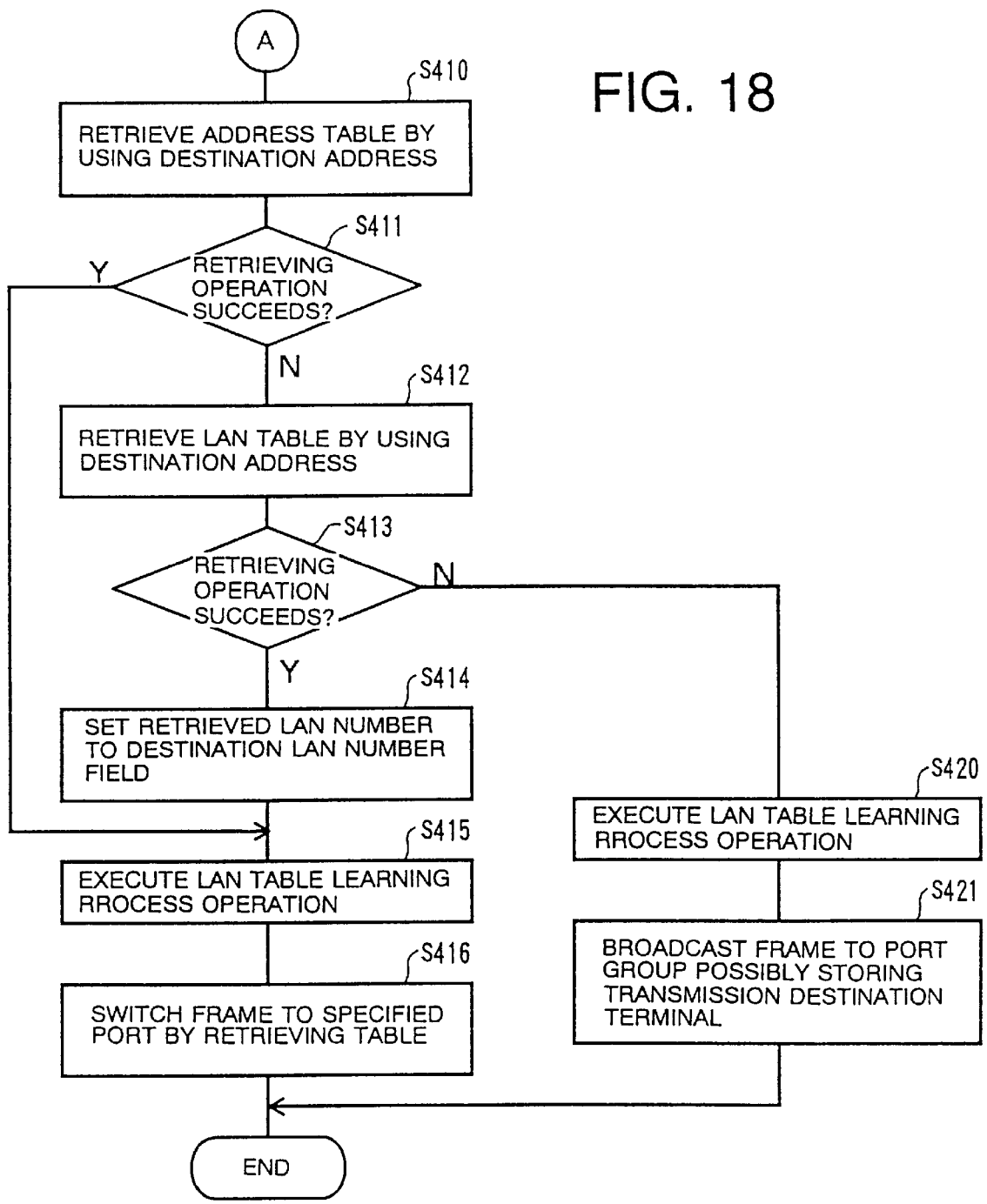
FIG. 18 is a second flow chart for describing a sequential operation of the switch unit during the broadcast frame response process operation.

On the other hand, when the switch unit can read out from the generation information table, the generation information corresponding to the transmission source address within the frame to be processed ("Y" at step S402), the switch unit judges whether or not this generation information is made coincident with the generation information set in the frame (step S404). Then, in the case that the first-mentioned generation information is identical to the set generation information ("Y" at step S404), the switch unit discards the frame (step S405), and then the process operation is accomplished. Conversely, when both of the generation information are not identical to each other ("N" at step S404), such generation information which has been stored in the generation information table in correspondence with the transmission source address within the frame is replaced by the generation information set in the frame (step S406). Then, a process operation as indicated in a flow chart of FIG. 18 is commenced.

That is, in order to specify such a port for supplying the frame to which the broadcast number has been set, the switch unit first retrieves the address table by employing the destination address within the frame (step S410). When the port number can be retrieved from the address table ("Y" at step S411), in such a case that the transmission source LAN of the frame to be processed is equal to another LAN, the switch unit executes the previously explained LAN table learning process operation (step S415), and switches the frame to the port discriminated by this retrieved port number (step S415), and then the process operation is completed.

When the switch unit fails in the retrieving operation of the port number from the address table ("N" at step S411), the switch unit tries to read out the LAN number and the port number, which are related to this destination address, by retrieving the LAN table by using the destination address (step S412). Then, when the switch unit succeeds in the retrieving operation of the port number and the LAN number ("Y" at step S413), the switch unit sets the retrieved LAN number to the destination LAN number field (step S414). Next, in such a case that the transmission source LAN of the frame to be processed is equal to another LAN, the switch unit updates the LAN table (step S415). When the process operation defined at the step S415 is executed after the process operation defined at the step S414 has been executed, since the frame to be processed is not directed to the own LAN (namely, own LAN number is not stored in LAN table), if the transmission source of the frame to be processed corresponds to another LAN, a combination between the transmission source LAN number and the input port number is registered into the LAN table.

Thereafter, the switch unit supplies the frame to the port specified by retrieving the table (in this case, LAN table) at a step S415, and then the process operation is ended.

Further when the switch unit fails in the retrieving operation of the port number from the LAN table ("N" at step S413), the switch unit executes the LAN table learning process operation (step S420) to thereby broadcast the frame to the port group for possibly storing the target terminal (step S421), and then the process operation is ended.

When the switch unit 11 receives the frame with VLAN tag to which the broadcast number has been set, this switch unit 11 employed in the switching hub 10 is operated in such a manner. As a consequence, in such a case that a mesh-shaped network is constituted by combining the switching hubs 10 according to the embodiment, extra frames are not transmitted/received between LANs, but only one frame reaches the target terminal.

Figure 19:
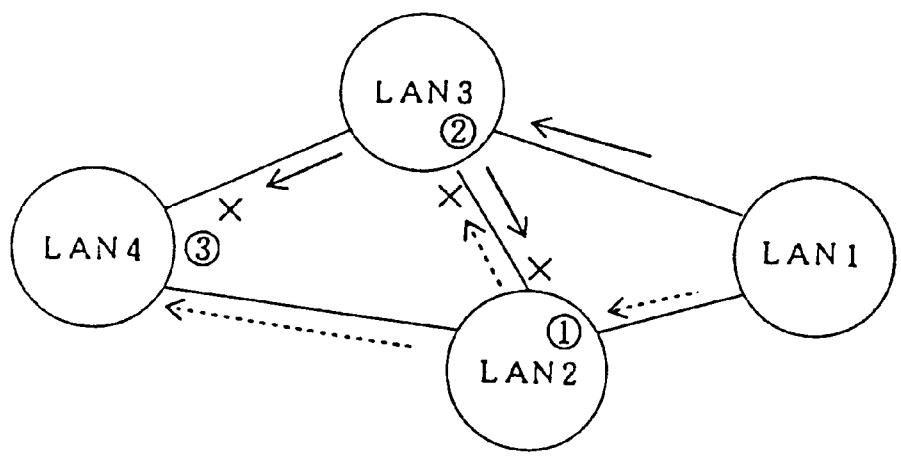
FIG. 19 is an explanatory diagram for explaining operations of the broadcast frame response process operation.

For instance, in such a case that a network having such a shape (same shape of FIG. 16) shown in FIG. 19 is constructed by employing four sets of the switching hubs 10, and further the frame is newly sent from the terminal Z belonging to LAN1 to the terminal W belong to LAN4, the switching hub (switch unit) of LAN1 transmits the frames having the same tag contents, to which the broadcast number and the generation information (random number) have been set, to the switching hubs of LAN2 and LAN3, respectively.

Then, the switching hub of LAN2 which has received the frame sent from the switching hub of LAN1 commences the broadcast frame response process operation, and executes the process operations defined at the step S403 and the steps S410 to S416, since the broadcast number is set to the above-described frame. In other words, the switching hub stores the transmission source address "Z" and the generation information (random number) contained in this frame. Next, this switching hub sends the frame having the same content to the switching hubs of LAN3 and LAN4.

Also, in the switching hub of LAN3, a similar process operation is carried out with respect to the frame sent from LAN1. As a result of this process operation, the frame having the same content is sent to the switching hubs of LAN2 and LAN4. As a consequence, the switching hub employed in LAN2 receives the frame having the same content from LAN3.

When the frame sent from LAN3 is received, the switching hub (switching unit) of LAN2 again commences the broadcast frame response process operation, since the broadcast number is set thereto. Then, the switching hub finds out such a fact that the combination between the transmission source address and the generation information, contained in this frame, are stored in the generation information table ("Y" at step S402 and "Y" at step S404). As a consequence, the switching hub discards the frame sent from LAN3 (indicated by symbol "X" in FIG. 19).

Similarly, the switching hub of LAN3 discards the frame sent from LAN2. As a result, the switching hub of LAN4 only receives one frame sent from LAN2 and one frame sent from LAN4. In the case that the switching hub of LAN4 receives such a frame whose transmission source address and generation information are made coincident with those of the frame received in the past, this switching hub discards the first-mentioned frame. As a consequence, only specific frames may reach the terminal "W". That is, these specific frames have passed through routes along which these frames can reach the terminal "W" within the shortest time among a plurality of routes established from the terminal "Z" to this terminal "W". Thereafter, the frame transmission/reception between the frame sending terminal and the frame receiving terminal will be carried out through such a route employed when the frame is firstly transmitted from the frame sending terminal to the frame receiving terminal.

It should be understood that the above-explained process operation may be applied to a route change during congestion. For example, in the network shown in FIG. 19, considering the case where a buffer overflow happens to occur at the port of the switching hub of LAN2 on the LAN1 side when such a route from LAN1 via LAN2 to LAN4 is set. In this case, as previously explained, in the switching hub (port) of LAN2, a certain frame is discarded, and a collision signal frame is sent out from the switching hub of LAN2 to the switching hub of LAN1. The collision signal frame holds a transmission source address of the discarded frame as congestion occurrence destination address data, and this transmission source address is set as a destination address. Also, the switching hub (switch unit) of LAN1 which has received the collision signal frame deletes from the LAN table, data related to an MAC address indicated by the congestion occurrence destination address set into the collision signal frame.

Figure 20:
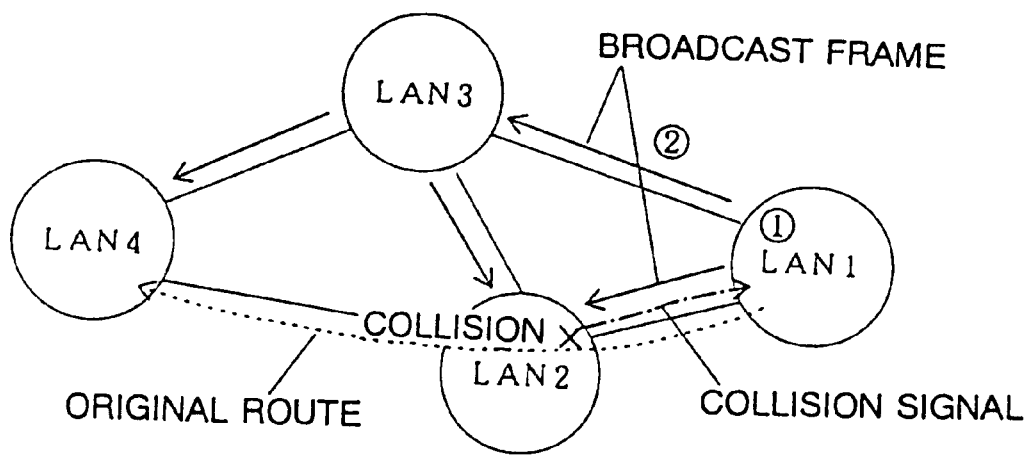
FIG. 20 is an explanatory diagram for explaining operations of the broadcast frame response process operation when congestion occurs.

As a result, in the case that a terminal corresponding to the transmission source of the discarded frame sends out a frame (to which same destination address is set) with respect to the same terminal, the switching hub employed in LAN1 cannot retrieve the port number at the step S305 of FIG. 11, but will execute the process operations defined after the step S310. That is, as schematically indicated in FIG. 20, after receiving the collision signal frame, the switching hub of LAN1 sends out such a frame having VLAN tag to which both the broadcast number and the generation information are set, to LAN2 and LAN4 when the frame to LAN3 is subsequently transmitted.

Also, since the switch unit uses the random number as the generation information, the generation information contained in this frame owns the different content (value) from that of the preceding generation information. As a consequence, when the frame sent from LAN1 is received, the switching hub of LAN3 branches its process operation at the step S404 (see FIG. 17) to the "N" side. In other words, the switching hub of LAN3 rewrites the content of the generation information table without discarding this frame. Next, since these switching hub of LAN3 executes the process operation shown in FIG. 18, this switching hub broadcasts the received frame to LAN2 and LAN4. Since the switching hubs of LAN2 and LAN4 are operated in a similar manner, when a collision signal frame is sent from LAN2 to LAN1, a similar process operation to that for the initial route setting operation is subsequently carried out, so that a new communication route (for example, LAN1–LAN3–LAN4) may be set.

Figure 21:
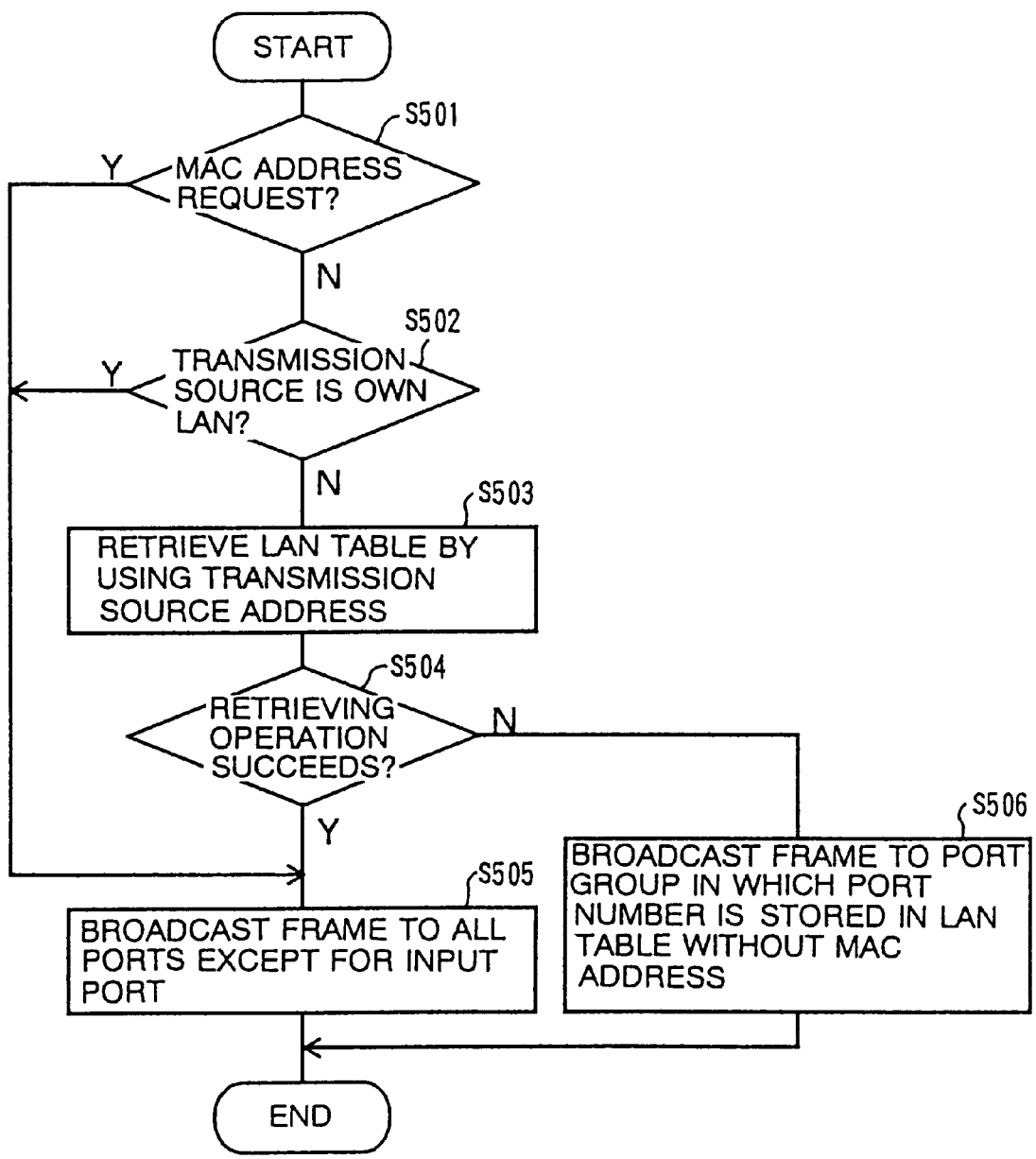
FIG. 21 is a flow chart for describing a support process operation executed with respect to the broadcast frame of the upper-grade protocol.
Figure 22:
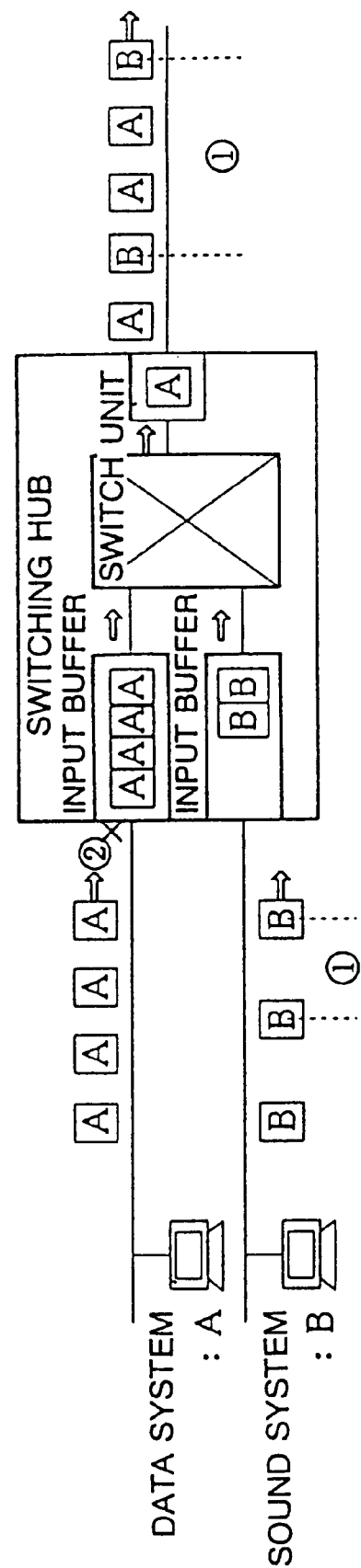
FIG. 22 is the schematic diagram for explaining the problems which are seen in the conventional switching hub.
Figure 23:
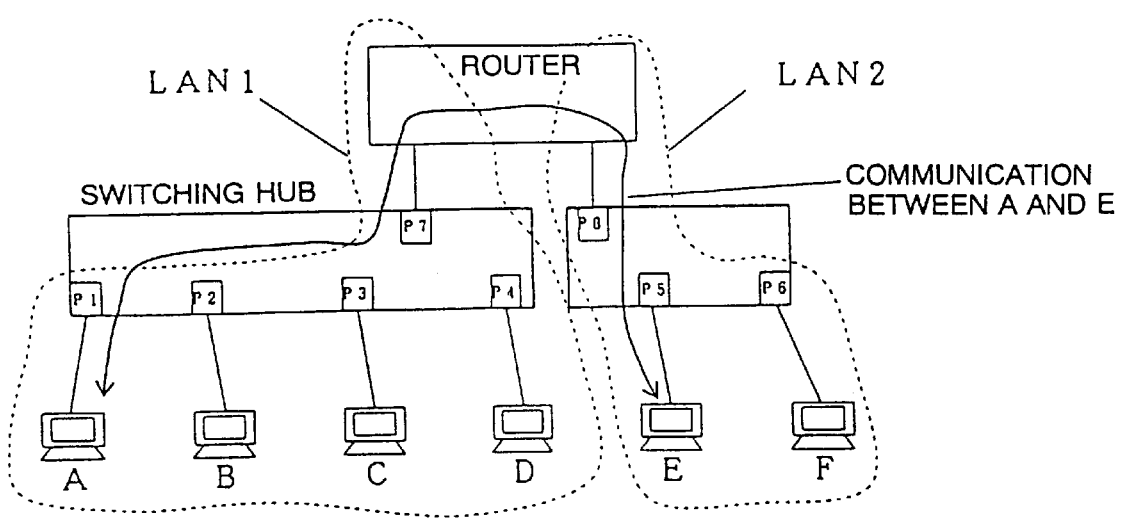
FIG. 23 is the explanatory diagram for explaining the network constituted by employing the conventional switching hubs.

Referring now to FIG. 21, a support process operation will be explained which is provided in order to support a broadcast protocol. As previously described, the support process operation is commenced by the switch unit 12 which has received such a frame with VLAN tag in which a destination address is set to "all 1".

As indicated in FIG. 21, while the support process operation is carried out, the switch unit 12 first checks whether or not the Ethernet type indicates a protocol used to interrogate an MAC address of a communication party (step S501). Then, when this Ethernet type corresponds to the Ethernet type indicative of such a protocol (for example, ARP), the switch unit broadcasts this frame to all the ports except for the port which has received the frame (step S505), and then the support process operation is accomplished. Conversely, when this Ethernet type does not correspond to the Ethernet type indicative of such a protocol ("N" at step S501), the switch unit judges whether or not the transmission source terminal belongs to the own LAN based upon the transmission source address contained in the frame (step S502). Then, when the transmission source terminal belongs to the own LAN ("Y" at step S502), the switch unit similarly broadcasts the frame to be processed to all the ports except for the input port (step S505), and then this support process is ended.

Also, in the case that the transmission source terminal is not equal to the terminal belonging to the own LAN ("N" at step S502), the switch unit 12 retrieves the LAN table by employing the transmission source address (step S503). Then, in the case that the transmission source address is stored in the LAN table ("Y" at step S504), the process operation is advanced to the step S505 at which the switch unit broadcasts the frame to all the ports except for the port which has received the frame, and thereafter the process operation is accomplished. Conversely, when the transmission source address is not stored in the LAN table ("N" at step S504), the switch unit broadcasts the frame to a port group in which the port number is stored in the LAN tables without the MAC address (step S506), and then the process operation is ended.

In other words, as to the normal broadcast frame, in such a case that a terminal belonging to the switching hub 10 (switch unit 12) did not establish any communication with the transmission source terminal of this broadcast frame in the past (namely, transmission source address was not stored in LAN table), this switching hub 10 does not transmit the frame to the terminal belonging thereto, but executes a process operation for relaying the broadcast frame to another LAN which has once established the communication with the transmission terminal of the broadcast frame at a step S506.

That is to say, the normal broadcast frame (except for APR and so on) corresponds to a frame which is sent to such a terminal that any information has been transferred before transmitting this broadcast frame. As a result, there is no problem that no broadcast frame is supplied to the switching hub and such a terminal through which no communication is established with the transmission source terminal of the broadcast frame.

As a consequence, this switching hub employs the above-described process operation with respect to the broadcast frame of the upper-grade protocol in order to avoid increasing of the unwanted traffics, which is caused by supplying the broadcast frame to the terminal which does not require the supply of the broadcast frame, and also to the port connected to the switching hub.

Also, the switch unit 12 broadcasts the frame to all the ports irrelevant to the contents of the LAN table with respect to the ARP and the like corresponding to the protocol used for such a terminal that the communication is first established. As a result, this switching hub 10 may accept such a protocol.

As previously explained, the reason why the LAN table learning process operation is not executed during the support process operation is given as follows. In case of the normal broadcast frame, the route has been set before transmitting this broadcast frame. In case of the broadcast frame such as ARP, there is no clear definition as to whether or not the communication is subsequently and actually established in the route employed in the transmissions of the respective broadcast frames.

MODIFICATION

In accordance with the switching hub according to the above-described embodiment, when the network is constituted, this switch hub is arranged in such a manner that the buffering control of the frame (namely, communication quality control) may be carried out in the respective switching hubs existing until the frame reaches the frame receiving terminal under such a condition defined in the service class table within the switching hub for storing the frame sending terminal. Alternatively, the switching hub may be constituted in such a way that the service class is determined from the Ethernet type contained in the frame irrelevant to such a fact as to whether or not the VLAN tag is present. Even when the switching hub is constituted by this way, if the service class tables having the same contents are set to the respective switching hubs for constituting the network, then the same communication quality controls may be carried out in the respective switching hubs provided from the frame sending terminal to the frame receiving terminal.

In such an alternative case that only the communication quality control in a single LAN is intended to be performed, it is possible to employ such a switching hub made by removing the function for adding the VLAN tag from the switching hub according to the above embodiment.

Alternatively, the switching hub may be constituted in such a manner that the service class used in the communication quality control is selectable from the service class within the frame with VLAN tag, and also the service class within the service class table. That is to say, it is possible to constitute a switching hub (port) in such a manner as follows: Under normal condition, this switching hub may be operated in the same operation as the switching hub according to the above embodiment. When a predetermined instruction is entered (namely, when preselected data is internally set), this switching hub may read out the service class corresponding to the Ethernet type within the frame from the service class table irrelevant to such a fact as to whether or not the VLAN tag is present, and thus may perform the communication quality control in response to this read service class.

Furthermore, it is possible to constitute such a switching hub, while employing a table for storing a corresponding relationship between generation information and a LAN number as a generation information table, in which a process operation related to the generation information (namely, broadcast frame response process operation, and process operation for collision signal frame) may be carried out in unit of not the destination address, but the destination LAN number.

What is claimed is:

1. A switching hub used in combination with a terminal for transmitting./receiving a frame having a type information field into which type information indicative of a type of data is set, comprising:

a plurality of input/output ports;

a switch unit connected to said plurality of input/output ports, for switching a frame supplied from each of said input/output ports based upon information contained in this frame; and a service class table for storing thereinto a correspondence relationship between the type information and the service class; wherein:

each of said plural input/output ports includes:

a buffer memory for storing the frame;

a management information memory for storing thereinto a plurality of combined information constituted by storage region information indicative of a region of said buffer memory and by the service class in such a format by which a relative sequence of storing the respective combined information can be recognized, said storage region information being used to store the frame;

a receiving unit for receiving the frame;

a storage control unit by which when said receiving unit receives the frame, a region of said buffer memory capable of storing said frame is specified based upon the storage region information stored in said management information memory to thereby store said frame into the specified region; and combined information constructed of storage region information indicative of the specified region and a service class related to type information set into a type information of said frame in said service class table is added to said management information memory in such a format by which it can be recognized that said combined information has been stored after the combined information previously stored in said management information memory; and a read-out control unit by which when the read-out control unit is selected by said switch unit, combined information related to a service class capable of statisfying a predetermined condition and furthermore lastly stored is specified from the combined information stored in said management information memory; a frame stored in a region of said buffer memory designated by storage region information contained in said specified combined information is supplied to said switch unit; and the specified combined information stored in said management information memory is deleted.

2. A switching hub as claimed in claim 1 wherein:

in the case that the frame received by said receiving unit corresponds to a frame to which a service class field is not attached, said storage control unit stores into said buffer memory, such a frame formed by attaching a service class field to which a service class has been set; whereas in the case that the frame received by said receiving unit corresponds to a frame to which the service class field is attached, said storage control unit adds combined information having the service class set to said service class field into said management information memory.

3. A switching hub as claimed in claim 1 wherein:

said service class table stores a correspondence relationship between the type information and the service class with respect to each of said input/output ports; and the storage control unit provided in each of said input/output ports acquires the service class corresponding to the type information within the frame by using the correspondence relationship related to the own input/output port stored in said service class table.

4. A switching hub comprising:

a plurality of input/output ports;

a switch unit connected to said plurality of input/output ports, for switching a frame supplied from each of said input/output ports based upon information contained in this frame;

a LAN table for storing a combination among a LAN number equivalent to LAN discrimination information, a port number equivalent to discrimination information of the input/output ports, and an MAC address equivalent to discrimination information of a terminal; and a holding unit for holding an own LAN number equivalent to a unique LAN number; wherein:

each of said plurality of input/output ports includes:

a transmitting/receiving unit for transmitting/receiving a frame;

a buffer memory for temporarily storing thereinto the frame received by said transmitting/receiving unit;

a recognizing unit for recognizing whether or not said transmitting/receiving unit is directly connected to the terminal;

a reception frame adjusting unit by which when said transmitting/receiving unit receives a frame, in such a case that said recognizing unit recognizes that said transmitting/receiving unit is directly-connected to the terminal, a tag field is attached to said frame, whereby said field attached with said tag field is outputted; whereas in such a case that said recognizing unit recognizes that said transmitting/receiving unit is not directly connected to the terminal, this received frame is directly outputted; said tag field containing a destination LAN number field to which predetermined information for indicating that a LAN number of a LAN belonging to a destination terminal is unknown has been set, a destination LAN number field to which the own LAN number held by said holding unit has been set, and a transmission source LAN number field;

a buffer control unit by which when the frame outputted by said reception frame adjusting unit is stored in said buffer memory and is selected by said switch unit, such a frame which has been lastly outputted by said reception frame adjusting unit and selected from the frames stored in said buffer memory is supplied to said switch unit; and a transmission frame adjusting unit by which when a frame is supplied from said switch unit, in such a case that said recognizing unit recognizes that the transmitting/receiving unit is directly connected to the terminal, such a frame made by removing the tag field from the supplied frame is produced to thereby be supplied to said transmitting/receiving unit; whereas in the case that said recognizing unit recognizes that the transmitting/receiving unit is not directly connected to the terminal, the frame supplied from said switch unit is directly supplied to said transmitting/receiving unit; and wherein:

said switch unit includes:

a selecting unit for circulatably selecting an input/output port to be processed from said plurality of input/output ports;

a first read-out trying unit for trying to read out from said LAN table, a port number and a LAN number corresponding to the destination MAC address set into the frame to be processed, which is equal to said frame supplied from said input/output port selected by this selecting unit;

a first supplying unit by which when both said port number and said LAN number are read out by said first read-out trying unit, said frame to be processed in which this LAN number has been set to the destination LAN number field is supplied to the input/output port discriminated by said read-out port number;

a second read-out trying unit by which when both said port number and said LAN number are not read out by said first read-out trying unit, a port number corresponding to the destination LAN number set into the destination LAN number field within the frame to be processed is tried to be read out from said LAN table;

a second supplying unit by which when the port number is read out by said second read-out trying unit, said frame to be processed is supplied to such an input/output port discriminated based on said read-out port number;

a third supplying unit by which when the port number is not read out by said second read-out trying unit, said frame to be processed is broadcasted to all of such input/output ports possibly connected to a terminal which should receive this frame to be processed; and a LAN table learning unit by which when the frame is supplied by said first supplying unit or said third supplying unit, a combination among a LAN number, a port number of the input/output port, and a transmission source MAC address is stored into said LAN table; said LAN number being set to a transmission source LAN number field within said frame to be processed; said port number of said input/output port being selected by said selecting unit; and said transmission source MAC address being set into the frame to be processed.

5. A switching hub as claimed in claim 4 wherein:

said terminal corresponds to such a frame having a type information field into which type information indicative of a type of data is set; wherein:

said switching hub further comprises:

a service class table for storing therein a correspondence relationship between the type information and the service class;

a service class field is also contained with respect to the frame received by said transmitting/receiving unit; said reception frame adjusting unit adds a tag field to which a service class has been set to said service class field; said service class corresponding to the type information set into the type information field within this frame is said service class table; and also said buffer control unit supplies to said switch unit, such a frame which has been lastly outputted by said frame adjusting unit and in which the service class set into the frame can satisfy a preselected condition among the frames stored in said buffer memory.

6. A switching hub as claimed in claim 5 wherein:

said service class table stores thereinto a service class made of a first service class indicative of allowances with respect to a delay, and a second service class indicative of allowances with respect to a discard; and while being selected by said switch unit, in such a case that a use ratio of said buffer memory is smaller than a predetermined value, said buffer control unit selects the frame which has been lastly outputted by said reception frame adjusting unit and then outputs the selected frame to said switch unit from the frames for indicating that the first service class is not highly allowable to the delay, stored in said buffer memory; whereas in the case that the use ratio of said buffer memory is larger than, or equal to said predetermined value, said buffer control unit selects the frame which has been lastly outputted by said reception frame adjusting unit and then outputs the selected frame to said switch unit among the frames for indicating that the second service class is not highly allowable to the discard, stored in said buffer memory.

7. A switching hub as claimed in claim 6 wherein:

in the case that the use ratio of said buffer memory is lager than, or equal to said predetermined value, said buffer control unit selects such frames for indicating that the first service class is not highly allowable to the delay from the frames for indicating that the second service class is not highly allowable to the discard, stored in said buffer memory, and also selected the frame which has been lastly outputted from said reception frame adjusting unit from said selected frames, whereby said buffer control unit supplies said lastly outputted frame to said switch unit.

8. A switching hub as claimed in claim 4 wherein:

when said tag field is not contained in the frame received by said transmitting/receiving unit, said recognizing unit recognizes that said transmitting/receiving unit is directly connected to the terminal; whereas when said tag field is contained in the frame received by said transmitting/receiving unit, said recognizing unit recognizes that said transmitting/receiving unit is not directly connected to the terminal.

9. A switching hub as claimed in claim 4 wherein:

said switching hub further comprises; an address table for storing thereinto a correspondence relationship between a port number and an MCA address, related to all of the input/output ports directly connected to the terminal;

said switch unit further includes:
 a zero-th read-out trying unit for reading out from said address table, a port number corresponding to the destination MAC address set into the frame to be processed, which is supplied from the input/output port selected by said selecting unit; and
 a zero-th supplying unit by which when the port number is read out by said zero-th read-out trying unit, said frame to be processed is supplied to the input/output port discriminated by said read-out port number; and said first read-out trying unit included in said switch unit functions when the port number is not read out by said zero-th trying unit.

10. A switching hub as claimed in claim 9 wherein:

said switching hub further comprises: a generation information table for storing thereinto a correspondence relationship between generation information and the MAC address;

said reception frame adjusting unit adds a tag field containing a generation information field to the frame to be processed;

in such a case that a broadcast number is not set to a destination LAN number field of said frame to be processed, said third supplying unit broadcasts such a frame to be processed that the content of the destination LAN number field and the content of the generation information field are rewritten into generation information determined based upon the broadcast number and a predetermined sequence; and said third supplying unit registers a correspondence relationship between the determined generation information and a transmission source MAC address within the frame to be processed into said generation information table; and also in such a case that the broadcast number is not set to the destination LAN number field of the frame to be processed, said third supplying unit directly broadcasts the frame to be processed;

in such a case that the broadcast number is set to the destination LAN number field within the frame to be processed, said zero-th read-out trying unit tries to read out the generation information related to the transmission source MAC address set to the frame to be processed from said generation information table; in such a case that generation information having the same content as that of generation information to be processed is read out which is equal to the generation information stored in the generation information field of the frame to be processed, said zero-th read-out trying unit discards said frame to be processed; and also in the case that generation information having a different content from that of said generation information to be processed and the generation information is not read out, said zero-th read trying unit updates the content of said generation information table in such a way that said generation information is stored as generation information corresponding to the transmission source MAC address within said frame to be processed.

11. A switching hub as claimed in claim 10 wherein:

said third supplying unit determines the generation information by utilizing a random number generation algorithm.

12. A switching hub as claimed in claim 10 wherein:

in the case that the frame outputted by said reception frame adjusting unit cannot be stored into said buffer memory, said buffer control unit discards said outputted frame and one frame selected from the frames stored in the buffer memory, and also owns the destination MAC address set in the discarded frame as congestion generation data; whereby said buffer control unit produces a collision frame for notifying such a fact that congestion happens to occur to the terminal for sending out said frame, and also supplies the produced collision frame to said transmitting/receiving unit;

when the frame to be processed corresponds to the collision frame, said zero-th read-out trying unit deletes data related to an MAC address indicative of the congestion generation data within said collision frame from said LAN table.

13. A switching hub as claimed in claim 9 wherein:

in such a case that a port number of an input/output port selected by said selecting unit is not stored into said address table, and also a port number of an input/output port to which the frame to be processed is supplied by said first supplying unit, or said third supplying unit is stored into said address table, said LAN table learning unit stores into said LAN table, a combination among the LAN number set into the transmission source LAN number field within the frame to be processed, the port number of the input/output port selected by said selecting unit, and the transmission source MAC address set into the frame to be processed; and in such a case that said port number of the input/output port selected by said selecting unit is not stored into said address table, and also a port number of an input/output port to which the frame to be processed is supplied by said first supplying unit, or said third supplying unit is not stored into said address table, said LAN table learning unit stores into said LAN table, a combination between the LAN number set into the transmission source LAN number field within the frame to be processed, and the port number of the input/output port selected by said selecting unit.

14. A switching hub as claimed in claim 13 wherein:

in the case that the destination MAC address set into said frame to be processed corresponds to such information indicative of a broadcast frame, said zero-th read-out trying unit specifies the input/output port possibly for communicating with a transmission source terminal of said frame to be processed based upon said destination MAC address and the information stored in said LAN table; and also zero-th read-out trying unit broadcasts said frame to be processed to said specified input/output port.

15. A switching hub as claimed in claim 14 wherein:

in such a case that the destination MAC address set into said frame to be processed corresponds to such information indicative of a broadcast frame, and also the type information set into said frame to be processed represents a protocol used to interrogate the MAC address, said zero-th read-out trying unit broadcasts said frame to be processed to said plurality of input/output ports irrelevant to the content of the LAN table.

* * * * *